United States Patent
Phenix et al.

(10) Patent No.: US 7,509,641 B2
(45) Date of Patent: Mar. 24, 2009

(54) JOB PROCESSING FRAMEWORK

(75) Inventors: John Kevin Phenix, Broadstone (GB); Nicholas Clive Judge, Ferndown (GB)

(73) Assignee: JP Morgan Chase Bank, New York, NY (US)

( * ) Notice: Subject to any disclaimer, the term of this patent is extended or adjusted under 35 U.S.C. 154(b) by 870 days.

(21) Appl. No.: 10/847,990

(22) Filed: May 17, 2004

(65) Prior Publication Data
US 2005/0030555 A1    Feb. 10, 2005

Related U.S. Application Data

(60) Provisional application No. 60/471,385, filed on May 16, 2003.

(51) Int. Cl.
G06F 9/46    (2006.01)

(52) U.S. Cl. .................. 718/100; 718/101; 718/104

(58) Field of Classification Search .......... 718/102, 718/100, 101, 104; 705/43
See application file for complete search history.

(56) References Cited

U.S. PATENT DOCUMENTS

| | | | |
|---|---|---|---|
| 4,751,702 A | 6/1988 | Beier et al. | |
| 5,027,269 A | 6/1991 | Grant et al. | |
| 5,301,320 A | 4/1994 | McAtee et al. | |
| 5,325,527 A | 6/1994 | Cwikowski et al. | |
| 5,499,371 A | 3/1996 | Henninger et al. | |
| 5,539,885 A | 7/1996 | Ono et al. | |
| 5,553,235 A | 9/1996 | Chen et al. | |
| 5,566,297 A | 10/1996 | Devarakonda | |
| 5,594,863 A | 1/1997 | Stiles | |
| 5,630,047 A | 5/1997 | Wang | |
| 5,630,173 A | 5/1997 | Oprescu | |
| 5,673,403 A | 9/1997 | Brown et al. | |
| 5,689,698 A | 11/1997 | Jones et al. | |
| 5,692,181 A | 11/1997 | Anand et al. | |
| 5,712,971 A | 1/1998 | Stanfill et al. | |
| 5,717,925 A | 2/1998 | Harper et al. | |
| 5,732,262 A | 3/1998 | Gillespie et al. | |

(Continued)

FOREIGN PATENT DOCUMENTS

WO    WO 01/35209    5/2001

(Continued)

OTHER PUBLICATIONS

Thomas; Enterprise Javabeans(TM) Technology: Server Component Model for the Java(TM) Platform, Java.Sun.Com, May 2, 1999.

(Continued)

*Primary Examiner*—Thomas Lee
*Assistant Examiner*—Jaweed A Abbaszadeh
(74) *Attorney, Agent, or Firm*—Lowenstein Sandler PC

(57) ABSTRACT

A job processing framework according to the present invention allows an application to be developed independent of any particular service. Tasks performed by the application are broken up into smaller units of work, or "jobs," which are each bound to a particular service at execution, or "deployment." The binding occurs via a "deployer" comprising a configuration source. The configuration source includes instructions that bind particular jobs with a particular service. Therefore, if improved services are developed subsequent to the application, only the configuration source needs to be updated, not the application. Accordingly, significant time and expense is saved by allowing applications to be developed independent of particular services.

5 Claims, 42 Drawing Sheets

U.S. PATENT DOCUMENTS

| | | | |
|---|---|---|---|
| 5,734,887 A | 3/1998 | Kingberg et al. |
| 5,737,592 A | 4/1998 | Nguyen et al. |
| 5,761,499 A | 6/1998 | Sonderegger |
| 5,768,119 A | 6/1998 | Havekost et al. |
| 5,784,557 A | 7/1998 | Oprescu |
| 5,790,809 A | 8/1998 | Holmes |
| 5,801,689 A | 9/1998 | Huntsman |
| 5,802,367 A | 9/1998 | Held et al. |
| 5,806,075 A | 9/1998 | Jain et al. |
| 5,815,415 A | 9/1998 | Bentley et al. |
| 5,845,292 A | 12/1998 | Bohannon et al. |
| 5,889,992 A | 3/1999 | Koerber |
| 5,899,990 A | 5/1999 | Maritzen et al. |
| 5,926,637 A | 7/1999 | Cline et al. |
| 5,930,768 A | 7/1999 | Hooban |
| 5,937,198 A | 8/1999 | Nelson et al. |
| 5,937,402 A | 8/1999 | Pandit |
| 5,946,458 A | 8/1999 | Austin et al. |
| 5,949,412 A | 9/1999 | Huntsman |
| 5,960,200 A | 9/1999 | Eager et al. |
| 5,960,445 A | 9/1999 | Tamori et al. |
| 5,987,247 A | 11/1999 | Lau |
| 5,999,179 A | 12/1999 | Kekic et al. |
| 6,003,075 A | 12/1999 | Arendt et al. |
| 6,009,274 A | 12/1999 | Fletcher et al. |
| 6,009,405 A | 12/1999 | Leymann et al. |
| 6,011,916 A | 1/2000 | Moore et al. |
| 6,046,742 A | 4/2000 | Chari |
| 6,052,456 A | 4/2000 | Huang |
| 6,065,009 A | 5/2000 | Leymann et al. |
| 6,083,276 A | 7/2000 | Davidson et al. |
| 6,101,489 A | 8/2000 | Lannert et al. |
| 6,101,601 A | 8/2000 | Matthews et al. |
| 6,108,698 A | 8/2000 | Tenev et al. |
| 6,148,296 A | 11/2000 | Tabbara |
| 6,163,776 A | 12/2000 | Periwal |
| 6,173,439 B1 | 1/2001 | Carlson et al. |
| 6,178,409 B1 | 1/2001 | Weber et al. |
| 6,184,996 B1 | 2/2001 | Gase |
| 6,185,613 B1 | 2/2001 | Lawson et al. |
| 6,195,676 B1 | 2/2001 | Spix et al. |
| 6,226,684 B1 | 5/2001 | Sung et al. |
| 6,230,319 B1 | 5/2001 | Britt, Jr. et al. |
| 6,246,410 B1 | 6/2001 | Bergeron et al. |
| 6,249,877 B1 | 6/2001 | Kawakami et al. |
| 6,253,193 B1 | 6/2001 | Ginter et al. |
| 6,272,556 B1 | 8/2001 | Gish |
| 6,282,698 B1 | 8/2001 | Baker et al. |
| 6,288,790 B1 | 9/2001 | Yellepeddy et al. |
| 6,289,336 B1 | 9/2001 | Melton et al. |
| 6,292,933 B1 | 9/2001 | Bahrs et al. |
| 6,298,353 B1 | 10/2001 | Apte |
| 6,304,871 B1 | 10/2001 | Gajda et al. |
| 6,314,430 B1 | 11/2001 | Chang |
| 6,317,738 B1 | 11/2001 | Lohman et al. |
| 6,324,525 B1 | 11/2001 | Kramer et al. |
| 6,324,619 B1 | 11/2001 | Raverdy et al. |
| 6,332,161 B1 | 12/2001 | Sasson |
| 6,353,820 B1 | 3/2002 | Edwards et al. |
| 6,363,363 B1 | 3/2002 | Haller et al. |
| 6,363,499 B1 | 3/2002 | Delo et al. |
| 6,381,609 B1 | 4/2002 | Breitbart et al. |
| 6,430,556 B1 | 8/2002 | Goldberg et al. |
| 6,438,749 B1 | 8/2002 | Chamberlain |
| 6,442,533 B1 | 8/2002 | Hinkle |
| 6,442,748 B1 | 8/2002 | Bowman-Amuah |
| 6,453,127 B2 | 9/2002 | Wood et al. |
| 6,463,343 B1 | 10/2002 | Emens et al. |
| 6,463,439 B1 | 10/2002 | Dahlberg |
| 6,467,079 B1 | 10/2002 | Ettritch et al. |
| 6,470,384 B1 | 10/2002 | O'Brian et al. |
| 6,473,786 B1 | 10/2002 | Scouras et al. |
| 6,477,580 B1 | 11/2002 | Bowman-Amuah |
| 6,477,590 B1 | 11/2002 | Habusha et al. |
| 6,480,860 B1 | 11/2002 | Monday |
| 6,480,894 B1 | 11/2002 | Courts et al. |
| 6,484,310 B1 | 11/2002 | Przbylski et al. |
| 6,502,095 B2 | 12/2002 | Breitbart et al. |
| 6,502,207 B1 | 12/2002 | Itoh et al. |
| 6,505,238 B1 | 1/2003 | Tran |
| 6,510,352 B1 | 1/2003 | Badavas et al. |
| 6,518,983 B1 | 2/2003 | Grohmann et al. |
| 6,526,571 B1 | 2/2003 | Aizikowitz et al. |
| 6,539,337 B1 | 3/2003 | Provan et al. |
| 6,546,419 B1 | 4/2003 | Humpleman et al. |
| 6,553,428 B1 | 4/2003 | Ruehle et al. |
| 6,557,039 B1 | 4/2003 | Leong et al. |
| 6,571,282 B1 | 5/2003 | Bowman-Amuah |
| 6,571,389 B1 | 5/2003 | Spyker et al. |
| 6,578,068 B1 | 6/2003 | Bowman-Amuah |
| 6,584,497 B1 | 6/2003 | Case et al. |
| 6,590,587 B1 | 7/2003 | Wichelman et al. |
| 6,615,258 B1 | 9/2003 | Barry et al. |
| 6,643,679 B1 | 11/2003 | Erickson et al. |
| 6,654,784 B1 | 11/2003 | Wei |
| 6,657,625 B1 | 12/2003 | Chik et al. |
| 6,675,228 B1 | 1/2004 | Bahrs et al. |
| 6,704,805 B1 | 3/2004 | Acker |
| 6,725,231 B2 | 4/2004 | Hu et al. |
| 6,772,031 B1 | 8/2004 | Strand |
| 6,928,488 B1 | 8/2005 | de Jong et al. |
| 6,950,850 B1 | 9/2005 | Leff et al. |
| 7,107,591 B1* | 9/2006 | Karp et al. ............... 718/104 |
| 2001/0020255 A1 | 9/2001 | Hofmann et al. |
| 2001/0029604 A1 | 10/2001 | Dreyband et al. |
| 2002/0010867 A1 | 1/2002 | Schaefer et al. |
| 2002/0046239 A1 | 4/2002 | Stawikowski et al. |
| 2002/0055804 A1 | 5/2002 | Betawar et al. |
| 2002/0062475 A1 | 5/2002 | Iborra et al. |
| 2002/0065814 A1 | 5/2002 | Okamoto et al. |
| 2002/0069156 A1 | 6/2002 | Adam et al. |
| 2002/0069192 A1 | 6/2002 | Aegerter |
| 2002/0078115 A1 | 6/2002 | Poff et al. |
| 2002/0103725 A1 | 8/2002 | Martin et al. |
| 2002/0103835 A1 | 8/2002 | Kearney |
| 2002/0109718 A1 | 8/2002 | Mansour et al. |
| 2002/0111995 A1 | 8/2002 | Mansour et al. |
| 2002/0111999 A1 | 8/2002 | Andersson |
| 2002/0116205 A1 | 8/2002 | Ankireddipally et al. |
| 2002/0120685 A1 | 8/2002 | Srivastava et al. |
| 2002/0124054 A1 | 9/2002 | Dorn et al. |
| 2002/0124113 A1 | 9/2002 | Gargya et al. |
| 2002/0129096 A1 | 9/2002 | Mansour et al. |
| 2002/0133461 A1* | 9/2002 | Ramachandran ............ 705/43 |
| 2002/0133579 A1 | 9/2002 | Bernhardt et al. |
| 2002/0143721 A1 | 10/2002 | Charlet et al. |
| 2002/0143819 A1 | 10/2002 | Han et al. |
| 2002/0144101 A1 | 10/2002 | Wang et al. |
| 2002/0147857 A1 | 10/2002 | Sanchez, II et al. |
| 2002/0178191 A1 | 11/2002 | Sielken |
| 2002/0178434 A1 | 11/2002 | Fox et al. |
| 2002/0188765 A1 | 12/2002 | Fong et al. |
| 2002/0188928 A1 | 12/2002 | Szpak et al. |
| 2003/0009323 A1 | 1/2003 | Adeli |
| 2003/0028555 A1 | 2/2003 | Young et al. |
| 2003/0033121 A1 | 2/2003 | Chen et al. |
| 2003/0033159 A1 | 2/2003 | Altomare |
| 2003/0036809 A1 | 2/2003 | Landman et al. |
| 2003/0046317 A1 | 3/2003 | Cseri et al. |
| 2003/0050897 A1 | 3/2003 | Altomare |
| 2003/0069907 A1 | 4/2003 | Moreau et al. |
| 2003/0084067 A1 | 5/2003 | Obiaya |
| 2003/0093574 A1 | 5/2003 | Fablet et al. |
| 2003/0097383 A1 | 5/2003 | Smirnov et al. |

| | | | |
|---|---|---|---|
| 2003/0145132 | A1* | 7/2003 | Srinivasan .................. 709/328 |
| 2003/0160813 | A1 | 8/2003 | Raju |
| 2003/0167456 | A1 | 9/2003 | Sabharwal |
| 2003/0217033 | A1 | 11/2003 | Sandler et al. |
| 2004/0107183 | A1 | 6/2004 | Mangan |
| 2004/0220952 | A1* | 11/2004 | Cheenath .................. 707/100 |
| 2004/0230587 | A1 | 11/2004 | Doddington |
| 2005/0030555 | A1 | 2/2005 | Phenix et al. |
| 2006/0200535 | A1 | 9/2006 | Moser |

FOREIGN PATENT DOCUMENTS

| | | |
|---|---|---|
| WO | WO 01/35209 | 8/2001 |
| WO | WO 02/46916 | 6/2002 |
| WO | WO 02/046980 | 6/2002 |
| WO | WO 03/001373 | 1/2003 |

OTHER PUBLICATIONS

Rennhackkamp; One for the Road: Sybaseaes Adaptive Server Anywhere 6.0, M&T Publishing Inc., Section No. 10, vol. 11, p. 55, ISSN. 1041-5173.

McClanahan; Powerbuilder3.0, M&T Publishing Inc., vol. 6, No. 11, p. 57, ISSN. 1041-5173, Oct. 1993.

Unknown; Conjuring Up Com Through Scripting, p. 14, Jul. 2000.

Quantum SPC/DC Script File (.TDF) Definition Instruction Guide, ASI Data Myte Inc., Version 2.4, p. 2-14.

Myers; Scripting Graphical Applications by Demonstration, Human Computer Interaction Institute, Carnegie Mellon University, www.cs.cmu.edu/bam, p. 1-8, Apr. 1998.

Ousterhoust; Scripting Higher Level Programming for the 21st Century, Sun Microsystems Laboratories, Draft #2, p. 1-14, May 10, 1997.

Dolev, et al.; An Integrated Architecture for the Scalable Delivery of Semi-Dynamic Web Content, Proceedings of the Seventh International Symposium on Computers and Communications, IEEE, 2002.

Betwixt: Turning Beans Into XML, Apache Software Foundation, Archived Jun. 20, 2002 at <http://Web.Archive.Org/Web/20020620000410/Http://Jakarta.Apahce.Org.Commons/Betwixt/>, p. 1 of 1, Nov. 13, 2005.

XML Schema Part 0 Primer-W3C Working Draft, W3C, Feb. 2000, Retrieved From the Internet on Nov. 18, 2005 at <http://www.W3.org/TR/2000/WD-XMLSchema-0-20000225/>, 42 pages.

Frank M. Carrano, et al.; Frank M. Carrano, et al., Data Abstraction and Problem Solving With C++, Aug. 1998, Addison-Wesley, Chapter 2.

Brodkin; Brodkin, Use XML Data Binding to do Your Laundry, Retrieved From the Internet on May 19, 2006, Acessed and Printed From From the Internet on May 19, 2006 at http://www.Javaworld.com/Javaworld/JW-12-2001/JW-1228-JAXB.Html.

* cited by examiner

FIG. 3

*JobContext*  — 218

---
m_jobClass:Class
m_context:java.io.Serializable — 304
m_jobResult:java.io.Serializable
m_complete:boolean=false ---
+JobContext()  — 302
+JobContext(context:java.io.Serializable)
+JobContext(jobClass:Class,context:java.io.Serializable)
+toString():String

/ 216 java.io.Serializable
interface
*Job*

---

+setContext(context:java.io.Serializable):void
+getResultContext():java.io.Serializable
+execute():void

Resource
*JobResource* / 220

--- s_count:long=0
-m_resSync:Object=new Object()
m_name:String="" + s_count++
m_av:boolean=true
m_cbRef:StateObserver=null
m_cbManager:JobContextManager=null
m_context:JobContext=null
m_job:Job=null
m_failure:Vector=null
m_remote:boolean=true
m_retryCount:int=1

---

+JobResource()
getJobDetails():void
+setContext(jobManager:JobContextManager,cbRef:StateObserver,failure:Vector):void
+usingResource(thisResource:Resource):void
+registerFreeResourceObserver(objectObserver:Object,complexObserver:java.util.Observer):void
+registerResourceAvailableObserver(objectObserver:Object):void
+initialiseResource(prjCtx:String,ctx:String):Resource
+availableResource():boolean
+inUseResource():void
+freeResource():void
checkContextReference(clientContext:Serializable):Serializable
+run():void

FIG. 7 interface
JobContextManager — 206

+getNextJobContext():JobContext
+getJob(jobRef:JobContext,jobInst:JobResource):Job

FIG. 8 interface
JobContextBroker — 208

+getNextJobContext():JobContext

FIG. 9

*StateObserverService*
*Dispatcher* —202

```
+NUMBER_OF_RETRIES:int=1
+ROGUE_TIMEOUT:int=-1
+JMTRACE:String="/jobMonitor"
#s_DIBroker:ContextBrokerUtil=new ContextBrokerUtil(new
StringBuffer(s_SERVICE_REF).append("Dispatcher").append(ContextBroker.
DEL_BROKER).toString())
#m_failList: Vector = new Vector()
#m_ref: Collection = new Vector()
#m_delegateFeeder:JobProducerFeedManager=null
#m_feedThread:Thread=null
#m_minThread:Integer=null
#m_maxThread:Integer=null
#m_threadPool:PooledResourceManager=null
#m_jobPool:PooledResourceManager=null
#m_context:String=null
#m_prjctx:String=null
#m_jobResource:Class=null
#m_monitorState:boolean=true
#m_singleReference:Job=null
#m_start:long=0L
#m_sync:Object=new Object()
#m_closeSync:Object=new Object()
#m_monitorFreq:long = s_jobMonitorFreq
#m_jobList: Collection = null
#m_nextJob: Iterator = null
#m_rogueTO: int = ROGUE_TIMEOUT
#m_numberOfRetries: int = NUMBER_OF_RETRIES
#m_rogueJobManager: TimedResourceManager = null
#m_rogueThread: Thread = null
-s_jobMonitorFreq: long = 100L
```

```
+Dispatcher()
+Dispatcher(context:String,prjCtx:String,jobResource:Class,theMonitorS
tate:boolean,theRogueTime:int,theNumberOfRetries:int)
+Dispatcher(context:String,prjCtx:String,jobResource:Class,min:Integer
,max:Integer,theMonitorState:boolean,theRogueTime:int)
+Dispatcher(context:String,prjCtx:String,jobResource:Class,theMonitorS
tate:boolean,frequency:long,theRogueTime:int,theNumberOfRetries:int)
+Dispatcher(context:String,prjCtx:String,jobResource:Class,theMonitorS
tate:boolean,frequency:long,min:Integer,max:Integer,theRogueTime:int,t
heNumberOfRetries:int)
setJobContextBroker(delegateFeeder:JobProducerFeedManager):void
getJobContextBroker():JobProducerFeedManager
+setMinMaxThreads(min:Integer,max:Integer):void
#initialise(min:Integer,max:Integer):void
+dispatch(jobList:Collection,singleReference:Job):Vector  —902
#getJobMonitorTrace(prjCtx:String,name:String):Boolean
+eventChange() : void
+getMaxThread() : Integer
+setMaxThread(val : Integer) : void
+getMinThread() : Integer
+setMinThread(val : Integer) : void
#handleDispatchOf(jobList: Collection, singleReference: Job,
theNumberOfRetries: int): Collection
+close() : void
+getNextJobContext() : JobContext
+getJob(jobRef : JobContext, jobInst : JobResource) : Job
+unregisterClient(container : Resource) : void
+update(o: java.util.Observable, arg : Object) : void
-registerJob() : boolean
```

FIG. 10

Runnable
*DispatcherDaemon*  — 204

---

+DISPATCHER_DAEMON:String="dispatcher/daemon"
+RESOURCE_CLASS:String="/jobResourceClass"
+PRODUCER_CLASS:String="/jobProducerClass"
+POLLTIME:String="/pollTime"
+ONESHOT:String="/oneShot"
+MAXLIST:String="/maxList"
+JOBMONITOR:String="/jobMonitor"
+JOBROGUEMONITOR:String="/jobRogueTimeout"
+NUMBEROFRETRIES:String="/numberOfRetries"
s_DDBroker:ContextBrokerUtil=new ContextBrokerUtil(new
StringBuffer(DISPATCHER_DAEMON).append(ContextBroker.DEL_BROKER).toString())
+s_DAEMON:boolean=true
+s_WAIT_TIME:long=10 * 1000L
m_dispatcher:Dispatcher=null
m_producer:JobProducer=null
m_delay:long=0L
m_poll:long=0L
m_listSize:int=(int)JobProducer.PRODUCE_ALL
m_argList:String[]=null
m_oneShot:boolean=false
m_producerFeed:boolean=false
m_die:boolean=false
m_syncOn:Object=new Object()
m_ctx:String=""
m_prjCtx:String=""

--- getRESOURCE_CLASS(prjCtx:String,name:String):String
getProperty(property:String):Object
getPRODUCER_CLASS():String
getPOLLTIME():Integer
getNUMBEROFRETRIES():Integer
getONESHOT():Boolean
getMAXLIST():Integer
getJOBMONITOR():Boolean
getJOBROGUEMONITOR():Integer
+DispatcherDaemon(context:String,prjCtx:String,argList:String[])
initialise(jobResourceClass:String,jobProducerClass:String,pollTime:long,isOneShot:boolean,maxList:int,argList:String[],th
eMonitorState:boolean,theRogueTime:int,theNumberOfRetries:int):DispatcherDaemon
+killDaemon():void
+run():void
+main(args:String[]):void

FIG. 11

```
interface          210
JobProducer
```
```
                                              1102
+PRODUCE_ALL:int=-1

+initialiseJobList(maxList:int,minThread:Integer,maxThread:Integer,argList
:String[]):Integer
+preJobList():void
+postJobList():void
+getJobList():java.util.Collection
+setFeedEnd(noData:boolean):boolean
+noMoreFeed():boolean
+finalPostJobList():void
```

FIG. 12a

```java
public class SingleJobProducer implements JobProducer {

// arg[0] = start
    // arg[1] = increment int m_start;
    int m_increment;
    int m_maxList;

public SingleJobProducer()    {
    } public Integer initialiseJobList(final int maxList, final Integer minThread, final Integer maxThread, final String argList[]) throws Exception { m_maxList = maxList;

// arg[0] = start, default to 1
        // arg[1] = increment, default to 1 try
        {
            m_start = Integer.parseInt(argList[0]);
        } catch(Exception ex)
        {
            m_start = 1;
        } try
        {
            m_increment = Integer.parseInt(argList[1]);
        } catch(Exception ex)
        {
            m_increment = 1;
        }

System.out.println();
        System.out.println("Max Result Set Size [" + m_maxList + "]");
        System.out.println("Start           [" + m_start + "]");
        System.out.println("Increment       [" + m_increment + "]");
        System.out.println();
        System.out.flush();

return(null);

```
public java.util.Collection getJobList() throws Exception        {
                java.util.Vector result = new java.util.Vector();

// create a list for(int i = 0; i < m_maxList; i++)
        { result.add(new JobContext(new Long(m_start)));

m_start += m_increment;
        } return(result);
} public void preJobList() throws Exception {}
public void postJobList() throws Exception {} public void finalPostJobList() throws Exception {}
public boolean noMoreFeed() throws Exception {return(false);}
public boolean setFeedEnd(boolean noData) throws Exception {return(false);} public static void main(String args[]) throws Exception {
        System.out.println("SingleProducer\n\n");

JobProducer jp    = new SingleJobProducer();

// set max result set size to 10
        // arg[0] = start
        // arg[1] = increment jp.initialiseJobList(10, null, null, args);

// get some data java.util.Collection result1   = jp.getJobList();
        java.util.Collection result2   = jp.getJobList();
        StringBuffer         resultDebug = new StringBuffer("");
```

FIG. 12c

```
if (result1 != null)
{
    resultDebug.append("<").append(new java.util.Date()).append("> [");
    for(java.util.Iterator i = result1.iterator(); i.hasNext();)
        resultDebug.append(((JobContext)i.next()).getJobContext()).append(",");
    resultDebug.append("]\n");
}
if (result2 != null)
{
    resultDebug.append("<").append(new java.util.Date()).append("> [");
    for(java.util.Iterator i = result2.iterator(); i.hasNext();)
        resultDebug.append(((JobContext)i.next()).getJobContext()).append(",");
    resultDebug.append("]\n");
}
System.out.println(resultDebug.toString());
     }
}
```

Max Result Set Size [10]
Start           [1]
Increment       [1]

<Fri May 23 12:01:53 BST 2003> [1,2,3,4,5,6,7,8,9,10,]
<Fri May 23 12:01:53 BST 2003> [11,12,13,14,15,16,17,18,19,20,]

FIG. 13

*JobProducer*
*interface*      ╱212
JobFeedProducer

---
+getNormalisedJobList(currentList:java.util.Collection):java.util.Collection
+getJobList(currentList:java.util.Collection):java.util.Collection
+noMoreFeed():boolean
+getBlockSize():int
+sortNormalisedJobList(normalisedList:java.util.List):void

```java
public class BulkFeedJobProducer implements JobFeedProducer {
        static final java.io.Serializable []CONVERT_SER  = new java.io.Serializable[0];

class Blob implements java.io.Serializable{
                protected java.io.Serializable[] m_bc = null;

public Blob() {} public Blob(java.io.Serializable[] bc) {
                        m_bc = bc;
                } public final java.io.Serializable[] getContextList() {
                        return(m_bc);
                } public String toString() {
                        StringBuffer result = new StringBuffer("<");

if (m_bc != null)
                                for(int l = 0; l < m_bc.length; l++)
                                        result.append(m_bc[l]).append(",");

return(result.append(">").toString());
                }
    }
    // arg[0] = start
    // arg[1] = increment
    // arg[2] = block size int m_start;
    int m_increment;
    int m_blockSize;
    int m_maxList;

public BulkFeedJobProducer() {
    } public Integer initialiseJobList(final int maxList, final Integer minThread, final Integer
maxThread, final String argList[]) throws Exception { m_maxList = maxList;

// arg[0] = start, default to 1
                // arg[1] = increment, default to 1
                // arg[2] = block size , default to 2 try
                {
                        m_start   = Integer.parseInt(argList[0]);
                }
```

FIG. 14b

```
            catch(Exception ex)
            {
                    m_start = 1;
            } try
            {
                    m_increment = Integer.parseInt(argList[1]);
            } catch(Exception ex)
            {
                    m_increment = 1;
            } try
            {
                    m_blockSize = Integer.parseInt(argList[2]);
            } catch(Exception ex)
            {
                    m_blockSize = 2;
            }

System.out.println();
            System.out.println("Max Result Set Size   [" + m_maxList + "]");
            System.out.println("Max Result Block Size [" + m_blockSize + "]");
            System.out.println("Start                 [" + m_start + "]");
            System.out.println("Increment             [" + m_increment + "]");
            System.out.println();
            System.out.flush();

return(null);
    }
    public java.util.Collection getJobList() throws Exception        {
            java.util.Vector result = new java.util.Vector();
            java.util.Vector blob   = new java.util.Vector();

// create a list for(int i = 0; i < m_maxList; i++)
            {
                    blob.add(new Long(m_start));

if (blob.size() == m_blockSize)
                    {
                            result.add(new JobContext(new
Blob((java.io.Serializable[])blob.toArray(CONVERT_SER))));
                            blob.removeAllElements();
                    }
```

FIG. 14c

```
                    m_start += m_increment;
            }
            // anything missed off the end
            if (!blob.isEmpty())
            {
                    result.add(new JobContext(new
Blob((java.io.Serializable[])blob.toArray(CONVERT_SER))));
                            blob.removeAllElements();
            } return(result);
    }
    public java.util.Collection getNormalisedJobList(java.util.Collection currentList) {
            java.util.Vector normalised = null;

if (currentList != null)
            {
                    normalised = new java.util.Vector();

for(java.util.Iterator i = currentList.iterator(); i.hasNext();)
                    {
                            JobContext      bc  = (JobContext)i.next();
                            java.io.Serializable[] bcl =
((Blob)bc.getJobContext()).getContextList();

normalised.addAll(java.util.Arrays.asList(bcl));
                    }
            }
            return(normalised);
    }
    public java.util.Collection getJobList(java.util.Collection currentList) throws Exception {
            if (currentList == null || currentList.isEmpty())
                    return(currentList);
            else
            {
                    // package this up into a format created in 'getJobList()' java.util.Vector result = new java.util.Vector();
                    java.util.Vector blob   = new java.util.Vector();

// split up into the correct size for(java.util.Iterator i = currentList.iterator();;)
                    {
                            // backfill results
```

FIG. 14d

```
                    for(int l = 0; l < m_blockSize && i.hasNext(); l++)
                                    blob.add(i.next());

// add to the result set result.add(new JobContext(new
Blob((java.io.Serializable[])blob.toArray(CONVERT_SER))));
                                    blob.removeAllElements();

if (!i.hasNext())
                                    break;
                    }

// anything missed off the end if (!blob.isEmpty())
                    {
                                    result.add(new JobContext(new
Blob((java.io.Serializable[])blob.toArray(CONVERT_SER))));
                                    blob.removeAllElements();
                    } return(result);
            }
    } public void sortNormalisedJobList(java.util.List normalisedList) throws Exception {
            // order is not important
    } public int getBlockSize() throws Exception {
            return(m_blockSize);
    } public void preJobList() throws Exception {}
    public void postJobList() throws Exception {} public void finalPostJobList() throws Exception {}
    public boolean noMoreFeed() throws Exception {return(false);}
    public boolean setFeedEnd(boolean noData) throws Exception {return(false);} public static void main(String args[]) throws Exception {
            System.out.println("SingleProducer\n\n");

JobFeedProducer jfp    = new BulkFeedJobProducer();

// set max result set size to 17 (default block of 2)
            // arg[0] = start
            // arg[1] = increment
            // arg[2] = block size jfp.initialiseJobList(17, null, null, args);
```

FIG. 14e

```
// get some data
java.util.Collection result1  = jfp.getJobList();
java.util.Collection result2  = jfp.getJobList();
StringBuffer         resultDebug = new StringBuffer("");

if (result1 != null)
{
        resultDebug.append("<").append(new java.util.Date()).append("> [");
        for(java.util.Iterator i = result1.iterator(); i.hasNext();)
                resultDebug.append(((JobContext)i.next()).getJobContext()).append(",");
        resultDebug.append("]\n");

// normalise this, this may change the order of things
        java.util.Collection asSingleList = jfp.getNormalisedJobList(result1);

resultDebug.append("<to single list> [");
        for(java.util.Iterator i = asSingleList.iterator(); i.hasNext();)
                resultDebug.append(i.next()).append(",");
        resultDebug.append("]\n");

// put back as before, order may be different
        java.util.Collection asListOfList = jfp.getJobList(asSingleList);
        resultDebug.append("<to list of list> [");
        for(java.util.Iterator i = asListOfList.iterator(); i.hasNext();)
                resultDebug.append(((JobContext)i.next()).getJobContext()).append(",");
        resultDebug.append("]\n");

}
if (result2 != null)
{
        resultDebug.append("<").append(new java.util.Date()).append("> [");
        for(java.util.Iterator i = result2.iterator(); i.hasNext();)
                resultDebug.append(((JobContext)i.next()).getJobContext()).append(",");
        resultDebug.append("]\n");

// normalise this, this may change the order of things
        java.util.Collection asSingleList = jfp.getNormalisedJobList(result2);

resultDebug.append("<to single list> [");
        for(java.util.Iterator i = asSingleList.iterator(); i.hasNext();)
                resultDebug.append(i.next()).append(",");
        resultDebug.append("]\n");

// put back as before, order may be different
        java.util.Collection asListOfList = jfp.getJobList(asSingleList);
        resultDebug.append("<to list of list> [");
        for(java.util.Iterator i = asListOfList.iterator(); i.hasNext();)
```

FIG. 14f

```
        resultDebug.append(((JobContext)i.next()).getJobContext()).append(",");
                    resultDebug.append("]\n");
            }

System.out.println(resultDebug.toString());
        }
}
```

Max Result Set Size   [17]
Max Result Block Size [2]
Start               [1]
Increment     [1]

\<Fri May 23 12:00:51 BST 2003\>
[<1,2,>,<3,4,>,<5,6,>,<7,8,>,<9,10,>,<11,12,>,<13,14,>,<15,16,>,<17,>,]
\<to single list\> [1,2,3,4,5,6,7,8,9,10,11,12,13,14,15,16,17,]
\<to list of list\> [<1,2,>,<3,4,>,<5,6,>,<7,8,>,<9,10,>,<11,12,>,<13,14,>,<15,16,>,<17,>,]
\<Fri May 23 12:00:51 BST 2003\>
[<18,19,>,<20,21,>,<22,23,>,<24,25,>,<26,27,>,<28,29,>,<30,31,>,<32,33,>,<34,>,]
\<to single list\> [18,19,20,21,22,23,24,25,26,27,28,29,30,31,32,33,34,]
\<to list of list\>
[<18,19,>,<20,21,>,<22,23,>,<24,25,>,<26,27,>,<28,29,>,<30,31,>,<32,33,>,<34,>,]

FIG. 15

*JobContextBroker*
*Runnable* 214
*JobProducerFeedManager*

---

-m_die:boolean=false
-m_syncOn:Object=new Object()
-m_getCache:Vector=null
-m_ProducerCache:Vector=null
-m_newGetCache:Vector=null
m_nextJob:int=EMPTY
-m_lazyFeed:JobFeedProducer=null
-m_ProducerRefresh:long=0L
-m_state:StateHolder=new StateHolder(s_Running)
-m_threadState:StateHolder=new StateHolder(s_Stopped)
+s_REFRESH_TO:long=10000L
+EMPTY:int=-1
-s_Stopped:int=0
-s_Running:int=1
-s_toRefresh:int=2

---

+JobProducerFeedManager()
+JobProducerFeedManager(producer:JobFeedProducer)
+JobProducerFeedManager(producer:JobFeedProducer,refreshTime:long)
+noMoreFeed():boolean
+close():void
refresh():void
+waitTillRunning():void
+run():void
-readFromProducer(firstTimeRun:boolean):void
-incrementalRefresh():void
+getNextJobContext:JobContext

FIG. 16

```
Runnable          ─1600
interface
Resource
+s_RES_REF:String="ResourceRef/"
+s_ALLWAYS_ALIVE:long=0L ─1618
+s_ALLWAYS_BLOCK:long=0L ─1620    ─1602
```
```
+usingResource(thisResource:Resource):void
+registerResourceObserver(objectObserver:Object,complexObserver:java.util.Ob
server):void
+initialiseResource(prjCtx:String,ctx:String):Resource ─1610
+availableResource():boolean ─1612
+inUseResource():void ─1614
+freeResource():void
                    ─1616
```

FIG. 17

Resource —1702
Thread
ThreadResourceContainer

-m_ID: String=null
-m_die: boolean=false
-m_observer: Resource=null

+ThreadResourceContainer()
+getObjectObserver() : Resource
+resource(resource: Resource): void 1722
+inUseResource() : void
+availableResource() : boolean
+run() : void 1724

*Resource* —1704
ResourceTimerContainer m_resource:Resource=null
m_TimeStamp:long=0L
m_TO:long=0L
m_parent:TimedResourceManager=null -ResourceTimerContainer()
ResourceTimerContainer(resource:Resource,TO:long,parent:TimedResourceManager)
+registerResourceObserver(objectObserver:Object,complexObserver:java.util.Observer):void
+usingResource(thisResource:Resource):void
+initialiseResource(prjCtx:String,ctx:String):Resource
+availableResource():boolean
+inUseResource():void
+freeResource():void
+actionTimedOutResource():void
+durationTillTimeOut():long
+hasTimedOut():boolean
+resetTimeOut():void
resourceInstance():Resource
+timeOut():long
+toString():String
+run():void
+equals(obj:Object):boolean

PooledResourceManager
*java.util.Observable*
*java.util.Observer*
*PooledResourceManager*

---

-m_observer:Object=null
-m_toDie:boolean=false
-m_resourceReferences:Vector=new Vector()
-m_resourceRef:Class=null
-m_resourceCtx:String=null
-m_ctx:String=""
-m_prjCtx:String=""
-m_minSize:int=s_MinPool
-m_maxSize:int=s_MaxPool
-m_blockTime:long=s_blockTime
-m_waitTime:long=s_waitDelay
-m_handle:int=-1
-m_sync:Object=new Object()
+MINPOOL:String="/MinResource"
+MAXPOOL:String="/MaxResource"
+WAITTIME:String="/WaitTime"
+BLOCKTIME:String="/BlockTime"
-s_InfinitePool:int=-1
-s_MinPool:int=1
-s_MaxPool:int=10
-s_waitDelay:long=1000L
-s_blockTime:long=10000L
-s_RMBroker:ContextBrokerUtil=new ContextBrokerUtil(new
StringBuffer(s_RES_REF).append("PoolResource").append(ContextBroker.DEL_BROKER)
.toString())
  resourceInstance:Resource

---

-getMINPOOL(prjCtx:String,name:String):Integer
-getProperty(property:String):Object
-getMAXPOOL():Integer
-getWAITTIME():Integer
-getBLOCKTIME():Integer
-PooledResourceManager()
+PooledResourceManager(resourceRef:Class,resourceCtx:String)
+usingResource(thisResource:Resource):void
+registerResourceObserver(objectObserver:Object,complexObserver:java.util.Observer):void
+availableResource():boolean
+inUseResource():void
+initialiseResource(ctx:String,prjCtx:String):Resource
+freeResource():void   _2004
+run():void
+snapshotSize():int
+removeInstance(resource:Resource,restock:boolean):boolean   _2006
-checkForInstance():Resource
-waitForResource():Resource
-createResources(groupSize:int):int
-restockResources(size:int):boolean
-getInstance():Resource   _2002
-useThisResource(result:Resource):void
+notifyObservers(arg:Object):void
+update(o:Observable,arg:Object):void

FIG. 23

ServiceBrokerHelper
(from broker)

— 2300

- REGISTEREDAPP : Logical View::java::lang::String = PropertyUtil.getProperty("App.Name")
- BEANREF : Logical View::java::lang::String = "Bean"
- RULEREF : Logical View::java::lang::String = "Rules"
- HOMEREF : Logical View::java::lang::String = "Home"
- SOAPREF : Logical View::java::lang::String = "SoapBean"
- $s_remote : Logical View::java::util::HashMap = new HashMap ()
- $s_refLut : Logical View::java::util::HashMap = new HashMap ()

- getRETRIECOUNT(name : Logical View::java::lang::String) : Logical View::java::lang::Integer
- getRETRIEDELAY(name : Logical View::java::lang::String) : Logical View::java::lang::Integer
- getSERVICETYPE(name : Logical View::java::lang::String) : Logical View::java::lang::String
- getDelegate(serviceType : Logical View::java::lang::String) : DelegateService
- getNewService(remoteJNDI : Class, remote : boolean) : Serializable  — 2302
- getNewService(remoteJNDI : Class, remote : boolean, factoryName : Logical View::java::lang::String) : Serializable
- removeService(service : Serializable) : void

—2304

-$s_defaultService

FIG. 24

DelegateService — 2406
(from ServiceBrokerHelper)

createServiceHandler(remoteJNDI : Class, refName : Logical View::java::lang::String, serviceKey : Logical View::java::lang::String) : Logical View::java::lang::Object
getServiceInstance(serviceRef : Logical View::java::lang::Object) : Serializable
removeService(serviceRef : Logical View::java::lang::Object, remoteJNDI : Class, factoryName : Logical View::java::lang::String) : void
refreshHandle(serviceRef : Logical View::java::lang::Object, remoteJNDI : Class, factoryName : Logical View::java::lang::String) : void

FIG. 27a

```
public class ClientJob extends JobResource implements Job {
....
....
        public void execute() throws JobException {
                java.io.Serializable instance = null;

try
            {
                        // check if client context defined. If not, then grab from elsewhere m_clientContext = checkContextReference(m_clientContext);
                        // Follow the standard, use the remote interface to access the bean information if ((instance = getClientService()) != null)
                        {
                                    // retain a reference to a throwable Throwable failure = null;

// do this for a number of times for(int retry = 0; retry < m_retryCount; retry++)
                                    {
                                                // reset failure = null;

try
                                                {
                                                            m_result = runClientService(instance);

// all fine break;
                                                }
                                                catch(Throwable tx)
                                                {
                                                            // wait a bit, try again in a bit try
                                                            {
                                                                        Thread.sleep(RETRY_WAIT);
                                                            }
                                                            catch(InterruptedException ie)
                                                            {
                                                            }

// check if this is the end of the line finally
                                                            {
```

FIG. 27b

```
                                                    failure = tx;
                                    }
                                }
                            }

// check if failure needs to be raised
                            if (failure != null)
                                    throw failure;
                    } else
                            throw new JobException("Failure to get an instance of the Service class Specificed.");
    }
    catch(JobException je)
    {
            throw je;
    }
    // belts and braces
    catch(Throwable tx)
    {
            throw new JobException("Unexpected execute failure <" + m_name + "> Job Failure " + tx.getMessage() + "[" + tx + "]");
    }
    finally
    {
            // clear down transient references, these do not want to be cached m_clientContext = null;
            m_result        = null;

// clear down external reference, so clear up nicely if (instance != null)
            {
                    try
                    {
                            ServiceBrokerHelper.removeService(instance);
                    }
                    catch(Exception ex)
                    {
                    }
            }
    }
}
```

FIG. 27c

```
/**
 * overload these methods to create service references, etc.
 */ protected Serializable getClientService() throws Exception {
        return(ServiceBrokerHelper.getNewService(ServiceReference.class, m_remote));
} protected Serializable runClientService(Serializable instance) throws Exception {
        return(((ServiceReferenceRules)instance).execute(m_jobRef, m_clientContext));
}

}
```

| com/env/dispatcher/daemon/ [JP/1] |
|---|
| jobResourceClass (String) |
| jobProducerClass (String) |
| argList (String) [-] |
| pollTime (Integer) [10s] |
| oneShot (Boolean) [false] |
| jobMonitor (Boolean) [true] |
| jobRogueTimeout (Integer) [-1] |
| maxList (Integer) [-1] |
| numberOfRetries (Integer) [0] |
| minProducerPool (Integer) [-] |
| maxProducerPool (Integer) [-1] |
| blockUntilData (Boolean) [false] |
| exitCode (Integer) : 1 |

FIG. 30

| com/env/ServiceRef/ServiceBroker/[S/2] |
|---|
| retrieDelay (Integer) [3000] |
| retrieCount (Integer) [3] |
| serviceType (String) [-] |

FIG. 31

| com/env/ResourceRef/PoolResource/ [JP/6] |
|---|
| MinResource (Integer) [1] |
| MaxResource (Integer) [1] |
| WaitTime (Integer) [10s] |
| BlockTime (Integer) [50ms] |

FIG. 32

| com/env/ejb/ [JP/3] |
|---|
| JNDI (String) |

FIG. 33

```
com/env/ResourceRef/TimerResource/ [R/1]
NotAuto (Boolean)
WakeUp (Integer)
```

FIG. 34

```
com/env/ResourceRef/thread/ [R/2]
name (String) [-]
daemon (Boolean) [-]
priority (Integer) [-]
```

FIG. 35

```
com/env/ServiceRef/JobResource/ [JP/4]
remote (Boolean) [true]
retryCount (Integer) [1]
```

FIG. 36

```
CtxFactory
description (optional)
o - e.g. CHASE
ou - e.g. GMDR
```

FIG. 37

| CtxRec |
|---|
| description (optional)<br>o - e.g. CHASE<br>ou - e.g. GMDR<br>rtclass - e.g. java:/com/env/database/ |

JOB PROCESSING FRAMEWORK

CROSS-REFERENCE TO RELATED APPLICATIONS

This patent application is related to and claims the benefit of Provisional U.S. Patent Application No. 60/471,385, filed May 16, 2003 and is incorporated herein by reference in its entirety. This patent application is further related to U.S. Patent Application entitled "Service Interface," filed by J. Phenix and N. Judge herewith, which application is incorporated herein by reference in its entirety.

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of software transaction controllers and, more specifically, to a job processing framework that delays binding of a service protocol to a job for processing until the job is executed. Such delay allows software to be developed independently of service protocols.

BACKGROUND OF THE INVENTION

It is well known that technological change is occurring at a rapid pace. Such change can be of benefit in the area of software and software development. Developers use software services (e.g., Simple Object Access Protocol (SOAP), Enterprise JavaBens ™ and local services for distributed processing) to implement applications. However, new services are regularly developed that enables developers to select from a rich execution environment. This choice of services provides flexibility in initial implementation, but inhibits later modifications.

Once a developer has implemented an application according to a particular service, however, it is very difficult to implement application changes without conforming such changes to the constraints of the previously selected service. Therefore, developers typically must implement the changes in accordance with the service regardless of whether a new and improved service exists. If a developer desires to use a different service for the application, a partial rewrite of the application is commonly required.

Therefore, there is a problem in the art that, once a system is implemented, all new or changed processes are constrained by the selected service to ensure interoperability.

SUMMARY OF THE INVENTION

This problem is addressed and a technical solution achieved in the art by a job processing framework according to the present invention. An application according to the inventive framework is developed independently from a particular service. Tasks performed by the application are broken up into smaller units of work, or "jobs," which are each bound to a particular service at execution, or "deployment." The binding occurs via a "deployer" comprising a configuration source, e.g. a file. The configuration source includes instructions that bind particular jobs with a particular service. Therefore, if improved services are developed after the application is written, the configuration source and potentially service tier needs to be updated, not the application source code. Accordingly, significant time and expense is saved by allowing applications to be developed independently from particular services.

According to another aspect of the invention, the jobs generated by dividing the application's tasks are efficiently managed so that the tasks are completed quickly. The "Job producer" generated jobs are placed into a job "container." "Job consumers," which manage the execution of the jobs, are instructed as to the most efficient number of jobs to process and when to process the jobs. These instructions are also included in the configuration source, thereby allowing users of the framework to easily tweak the manner in which jobs are consumed to increase efficiency.

Therefore, the job processing framework according to this invention is highly configurable and enables developers to decide at deployment time which services jobs are bound to without having to make any code changes in previously developed applications.

BRIEF DESCRIPTION OF THE DRAWINGS

A more complete understanding of this invention can be obtained from a consideration of the specification taken in conjunction with the drawings, in which:

FIG. 3 is an exemplary Job Context class in accordance with FIG. 2;

FIG. 4 is an exemplary Job class in accordance with FIG. 2;

FIG. 5 is an exemplary Job Resource class in accordance with FIG. 2;

FIG. 7 is an exemplary Job Context Manager class in accordance with FIG. 2;

FIG. 8 is an exemplary Job Context Broker class in accordance with FIG. 2;

FIG. 9 is an exemplary Dispatcher class in accordance with FIG. 2;

FIG. 10 is an exemplary Dispatcher Daemon class in accordance with FIG. 2;

FIG. 11 is an exemplary Job Producer class in accordance with FIG. 2;

FIGS. 12*a*-12*c* are exemplary code for a Job Producer in accordance with FIG. 11;

FIG. 13 is an exemplary Job Feed Producer class in accordance with FIG. 2;

FIGS. 14*a*-14*f* are exemplary code for a Job Feed Producer in accordance with FIG. 13;

FIG. 15 is an exemplary Job Producer Feed Manager class in accordance with FIG. 2;

FIG. 16 is an exemplary Resource class in accordance with FIG. 2;

FIG. 17 are exemplary ResourceTimerContainer and ThreadResourceContainer classes in accordance with the Resource of FIG. 16;

FIG. 20 is an exemplary PooledResourceManager class in accordance with an exemplary embodiment of this invention;

FIG. 23 is an exemplary Service Broker Helper class in accordance with an exemplary embodiment of this invention;

FIG. 24 in an exemplary Delegate Service class in from FIG. 23 in accordance with an exemplary embodiment of this invention;

FIGS. 27a-27c are a code example of a Client Job of FIG. 26 in accordance with an exemplary embodiment of this invention;

FIG. 28 illustrates an exemplary structure of a configuration source in accordance with one aspect of this invention;

FIGS. 29 through 37 are exemplary rtclass nodes of the configuration source.

DETAILED DESCRIPTION

This specification is divided into four sections. Section I describes the job processing flow according to the exemplary embodiment of the invention. Section II describes the manner in which resources are managed according to the exemplary embodiment of this invention. Section III describes service utilities and Section IV describes an exemplary configuration file according to the exemplary embodiment of this invention.

Section I: Job Processing Flow

Figure 1:
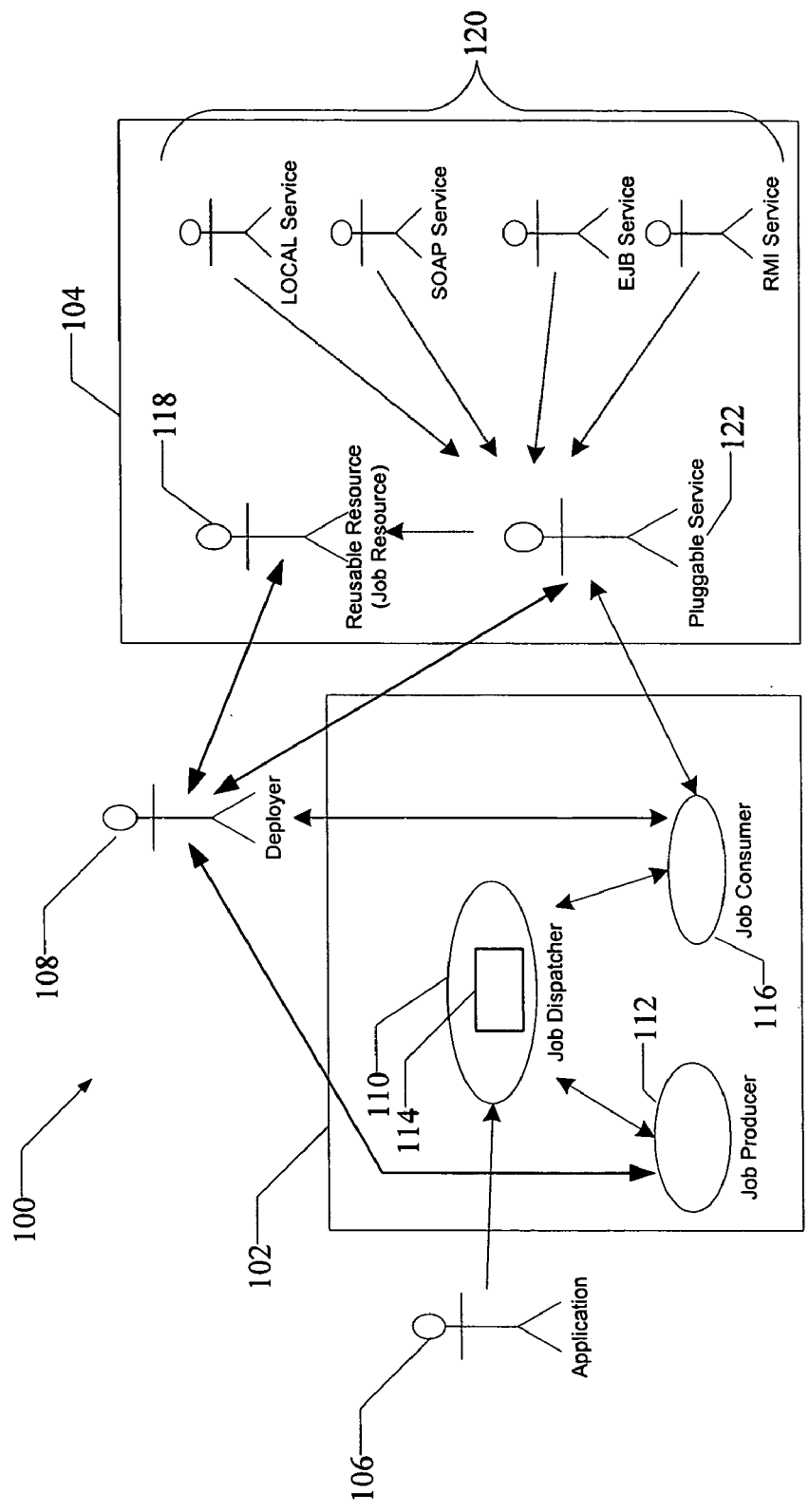
FIG. 1 is a block diagram that illustrates an exemplary embodiment of this invention.

FIG. 1 illustrates an overview of job processing framework 100 according to an exemplary embodiment of the present invention, illustrated herein as divided into a first box 102 and a second box 104. An application 106 performs various tasks via the framework 100. Boundary box 102 represents a portion of the framework 100 that divides the tasks from application 106 into atomic units of work, or "jobs," and efficiently manages the execution flow of such jobs. Boundary box 104 represents a portion of the framework 100 that binds each of the jobs to its associated service at execution, thereby allowing the application 106 to be implemented without constraint to any particular service or services.

The job processing framework 100 along with the application 106 and its associated service are executable on one or more computers. The code for the framework 100 and optionally the service(s) and application are stored on a computer readable medium that is read from and optionally written to by the one or more computers.

Deployer 108 represents a configuration data source that contains instructions as to how the components of the framework 100 operate. In particular, the configuration source of deployer 108 contains instructions as to which service protocol is associated with each job and how the execution flow of the jobs occurs. Accordingly, deployer 108 effects service selection and tuning of the framework 100 by the developer without implementing code changes in application 106. To elaborate, the developer modifies the configuration source of deployer 108 to make changes pertaining to service usage and job execution flow instead of modifying the code used to implement the application 106 or the framework 100. An exemplary configuration source is described in Section IV, below.

Now a lifecycle of a task performed by the application 106 via the framework 100 is described with reference to FIG. 1. Tasks, according to this embodiment, can be broken down into identical processing units, or "jobs." An example of such a task is processing large Extensible Markup Language (XML) files, where the file can be subdivided into many smaller files enabling the large file to be processed in parallel.

A task from application 106 is initially picked up by a job dispatcher 110 and then handed off to a job producer 112. Job producer 112 refers to the configuration source of deployer 108 to determine how the task is to be divided into separate jobs. The configuration source indicates, for instance, the desired granularity of the task being divided. In other words, the configuration source instructs job producer 112 as to the size of each job. Because the size of the jobs is configurable via the configuration source, the amount of network bandwidth used for distributed batch processing is controllable. As job producer 112 generates jobs from the task, job producer 112 also adds the jobs to a job "container" 114 managed by job dispatcher 110. Therefore, job producer 112 generates an in-flow of jobs to job container 114.

Advantageously, job producer 112 may be configured to generate jobs as a series of blocks of jobs. In this exemplary scenario, job producer 112 produces up to a defined maximum set of jobs that the dispatcher 110 manages until all jobs in the set have been executed. After the block of jobs has been processed, job producer 112 generates another block of jobs for processing.

Job producer 112 may also be configured to generate jobs as a continuous "feed;" that is, job producer 112 constantly generates jobs until no more jobs in the task remain. The difference between these two job production methods affects the way in which resources, such as threads, are managed by and available to the framework 100.

In the exemplary embodiment, job producer 112 not only generates jobs from the task, but also generates a "job context" for each job. The job context may include a reference to the job and a job status field, but will include a reference or handle to the materials of a job (the data to be processed). The job status field includes information about whether the job has been successfully executed, has failed to execute, how long the job has existed prior to execution, where it is in the execution process, and other important statistical and managerial information. The job contexts coexist with their associated jobs throughout the job lifecycle.

Along with managing job container 114, job dispatcher 110 also manages a pool of job resources, such as threads, that will be used to execute the jobs. Job dispatcher 110 refers to the configuration source of deployer 108 for instructions as to the resources available and the manner in which they are to be used to execute the jobs.

Execution of the jobs is managed by job consumer 116. When job consumer 116 is ready to operate, job consumer 116 requests a job resource from the pool of job resources from job dispatcher 110. If resources are available, job consumer 116 is assigned one (or more) of available resources 118 (box 104) and takes a job from job container 114. The number of jobs taken and which specific jobs are taken by job consumer 116 are determined by the configuration source of deployer 108. Armed with a job and a resource 118, job consumer 116 then accesses the configuration source of deployer 108 to determine which service 120 is associated with the job. It should be noted that the services listed at 120 are merely examples, and the invention is not limited to those services listed.

Having determined the appropriate service for the job, the job consumer hands the job off to service interface 122 (herein referred to as "pluggable service"). Pluggable service 122 wraps each job in appropriate content to conform to the service protocol identified by deployer 108. Once wrapped, the job is executed using the assigned job resource 118. After execution (or failure to execute by a certain period), status information about the job is updated in the associated job context and passed back to job dispatcher 110. Job execution status is recorded by job dispatcher 110. Also, resource 120 used by job consumer 116 is released back into the resource pool managed by dispatcher 110.

All of the jobs in the task are processed in the above-described manner, wherein job producer 112 continually fills job container 114 of job dispatcher 110, and job consumer 116 continually removes jobs from job container 114. Advantageously, an instance of job consumer 116 may consume more than one job at a time. It should also be noted that multiple instances of job dispatcher 110, job producer 112, and job consumer 116 maybe used. Multiple job producers 112 may increase efficiency in dividing the task into jobs. Multiple job dispatchers 110 may increase efficiency in making jobs and resources available to job consumers 116. Multiple job consumers 116 may increase efficiency in executing the jobs. Further, multiple job consumers 116 may be authorized to execute the same job, so that the multiple job consumers 116 race to execute the job first. In this scenario, only the results from the job consumer 116 that executes the job first are recorded.

Additionally, although boundary box 104 is shown separate from job consumer 116, it is advantageously incorporated within job consumer 116. In particular, boundary box 104 is responsible for wrapping the job via pluggable service 122 with the content required for its associated service and executing the job with job resource 118. Accordingly, boundary box 104 implements the binding and job execution functions of job consumer 116.

Further, a dispatcher daemon (not shown in FIG. 1) advantageously controls creation and termination of instances of job dispatcher 110. The dispatcher daemon creates one or more instances of job dispatcher 110 as tasks come in for processing. The dispatcher daemon may be configured for one-shot process execution or as a daemon.

Figure 2:
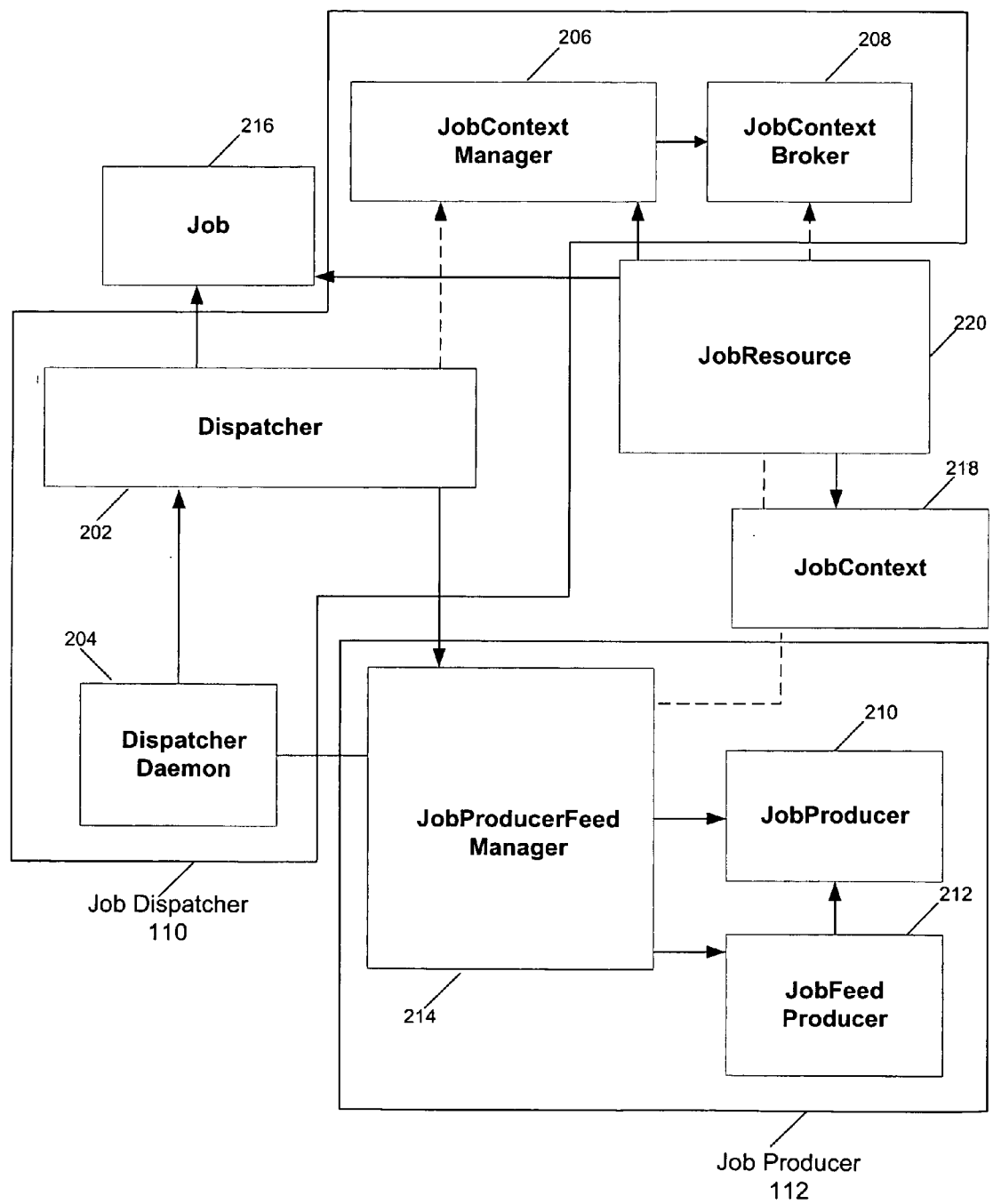
FIG. 2 is a class diagram illustrating the relationship among the classes of an exemplary implementation of the embodiment of FIG. 1.

FIG. 2 is a class diagram 200 illustrating an exemplary implementation of the embodiment of FIG. 1. In FIG. 2, the exemplary implementation of job dispatcher 110 includes a dispatcher class 202, a dispatcher daemon class 204, a job context manager class 206 and a job context broker class 208. Dispatcher daemon class 204 is an exemplary implementation of the dispatcher daemon previously discussed.

An exemplary implementation of job producer 112 includes a job producer class 210, a job feed producer class 212 and a job producer feed manager class 214. The exemplary implementation of jobs and job contexts created by job producer 112 comprise job class 216 and job context class 218, respectively. The exemplary implementation of job consumer 116 includes job resource class 220 which corresponds to job resource 118. As previously discussed, it is resource 118 that actually implements the execution of a job, and job resource 118 is included within job consumer 116 in this exemplary embodiment. Each of these classes is described in more detail, below.

FIG. 3 illustrates an exemplary embodiment of job context class 218. Objects of this class hold a reference to the data the job is to execute 302 and the results of the execution of the job. The job context is created in the framework via an instance of the job producer class 202 (described in FIG. 1). It should be noted that all references are advantageously implementers of the java.io.Serializable interface 304 to enable passage across process and machine boundaries via Remote Method Invocation(RMI) to RMI, EJB, SOAP, Common Object Request Broker Architecture(CORBA), etc., servers.

Figure 6:
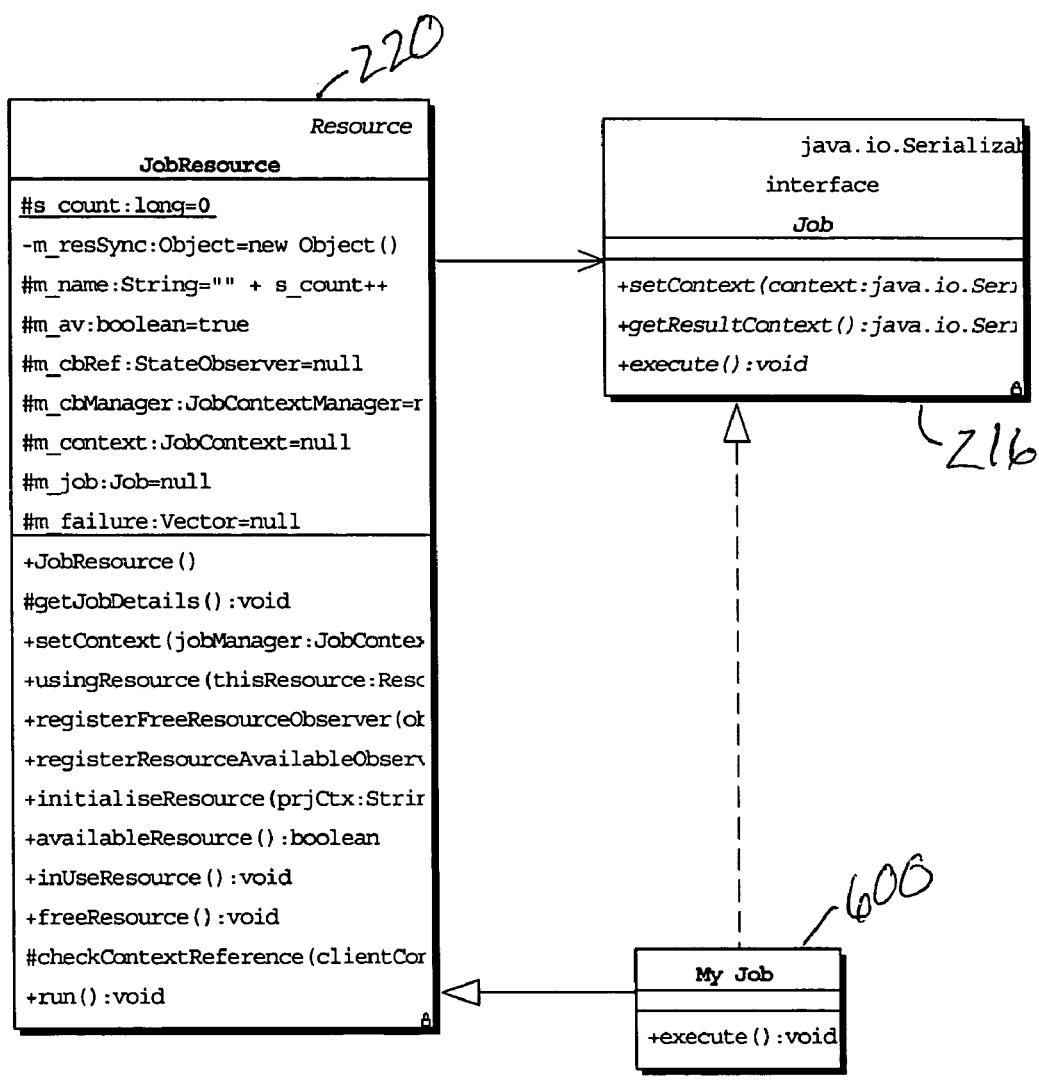
FIG. 6 illustrates the relationships among the Job Resource of FIG. 5, the Job of FIG. 6 and an exemplary job.

FIG. 4 and FIG. 5 illustrate exemplary embodiments of job class 216 and job resource class 220, respectively, according to an exemplary embodiment of this invention. Objects of type job 216 (FIG. 4) are generated by job producer 112 and are executed as discussed in connection with FIG. 1. Objects of type job resource 220 advantageously represent a reusable processing component. Job resource management is discussed in more detail in Section II, below. FIG. 6 illustrates illustrative embodiments of components for a job to be executed. An instance of job 216, having a job context, requires an instance of resource 220 to execute, as shown at 600.

FIG. 7 and FIG. 8 represent an exemplary embodiment of job context manager class 206 and job context broker class 208, respectively. Objects of the job context manager class 206 manage the production of job context 218 and job 216 instances when generated by job producer 112. The job context broker class 208 assists the job context manager class 206 in managing the generation of job context 218 instances.

Figure 18:
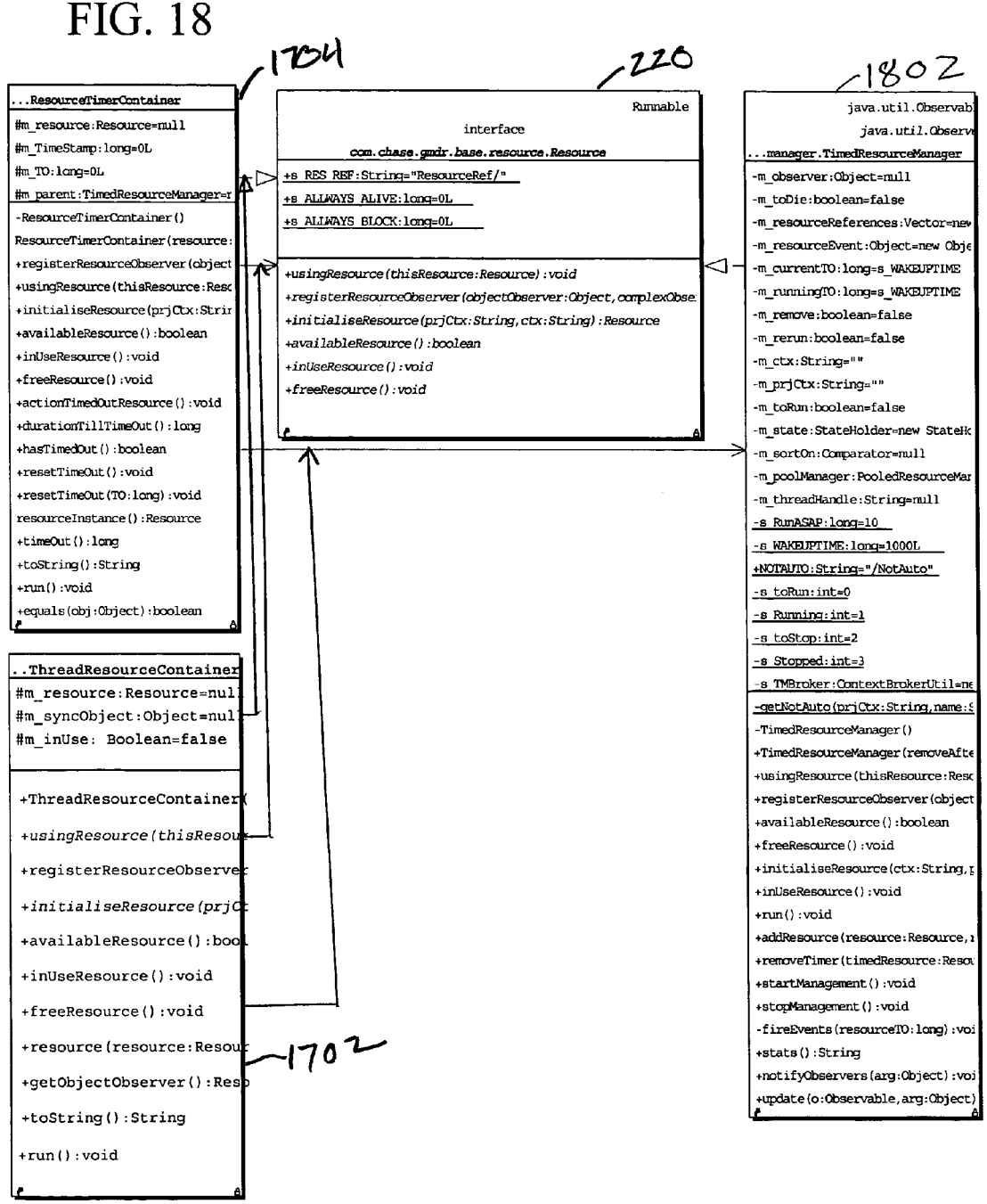
FIG. 18 illustrates the relationships among a Resource of FIG. 16, a ResourceTimerContainer and ThreadResourceContainer of FIG. 17 and a TimedResourceManager 1802.

FIG. 9 presents an exemplary embodiment of dispatcher class 202. Objects of the dispatcher class 204 are managers of the resource pools (described above in FIG. 1) and any associated timeouts of those resources. The pools of resources facilitate efficient job processing by managing the ability of job consumers 116 to execute jobs. The resource pools are implemented as instances of the thread resource container class 1830 (FIG. 18, described in more detail, below) and managed by the pooled resource manger class 2000 (FIG. 20, described in more detail, below). The resources included in the pool are instances of the job resource class 220. Rogue jobs (i.e., jobs that have timed out prior to successful execution, thereby tying up resources) are managed using the timed resource manager class 1802 (FIG. 18). Dispatcher 202 manages job execution using the dispatch class 902, given a job list and a reference to a job. The job list is a list of job contexts 206.

FIG. 10 comprises an exemplary embodiment of dispatcher daemon class 204. Objects of this class manage instances of the dispatcher class 202 with respect to the number and type of job producer(s) 112 being used. The "type" of job producer 112, in this context, refers to whether job producer 112 is a block job producer or a continuous feed job producer, as previously discussed.

FIG. 11 is an exemplary embodiment of job producer class 210. Job producer class 210 manages generation of a list of jobs 1102 and associated job contexts. Exemplary code for a simple job producer implementation returning a list of integers is presented in FIGS. 12*a*-12*c*. FIG. 13 illustrates an exemplary embodiment of job producer feeder class 212. An object of this class interfaces with an object of the job producer class 210 to produce jobs and job contexts on a continuous feed basis. Exemplary code for a simple job feed producer 212 implementation returning a list of a list of integers is illustrated in FIGS. 14*a*-14*f*.

FIG. 15 is an exemplary embodiment of job producer feed manager class 214. Objects of this type manage production of the continuous job feed. In particular, job producer feed manager 214 manages the life-cycle of a one-depth buffer of jobs. The configuration source of deployer 108 may describe buffer minimum and maximum size, the frequency to refresh the buffer, and other parameters to efficiently manage the continuous job feed.

Section II: Resource Management

A resource is typically a reusable component that may mediate access to physical (e.g., communications (COM) port) or logical (e.g., Java Database Connectivity(JDBC)conncetion) resources. According to framework 100, a resource has the following characteristics. A resource can be created, given some resource specific context information; is capable of timing out (if appropriate for the type of resource being used); can be considered available or unavailable; can refresh itself to prevent being permanently unavailable, i.e., a rogue resource; and has the effect of propagating events when refreshed.

A resource manager, such as job dispatcher 110 in FIG. 1, has the following characteristics. Job dispatcher 110 manages the resource pool in a thread-safe and load-balanced manner; handles addition and removal of resources from the pool; handles event propagation due to changes in the resource pool; and handles any resource changes external to the framework 100.

An exemplary implementation of resources and resource management system according to the present invention will now be discussed. The reader is reminded that resource management according to the exemplary embodiment occurs via dispatcher class 202 (corresponding to job dispatcher 110 in FIG. 1).

Referring to FIG. 16, an exemplary embodiment of resource class 1600 is shown. Objects of the resource class 1600 include the following methods. The "using resource" method 1602 enables a resource 1600 to register the fact that it is still being used. This method (1602) assists in the prevention of time-outs. The "register resource observer" method 1604 enables objects managing the resource 1600 to handle the resource's time-outs. The "initialize resource" method 1610 creates a new resource instance. The parameters to this method reflect broker interface context-specific information, where resource creation context information can be accessed. The "available resource" method 1612 checks if the resource is available. The "in-use resource" method 1614 indicates if the resource is in use. The "free resource" method 1616 makes the resource available again. The "alive" constant 1618 and the "block" constant 1620 require that the resource always be available (i.e., has no timeout) and require that a thread be blocked anytime the resource is unavailable, respectively.

Figure 19:
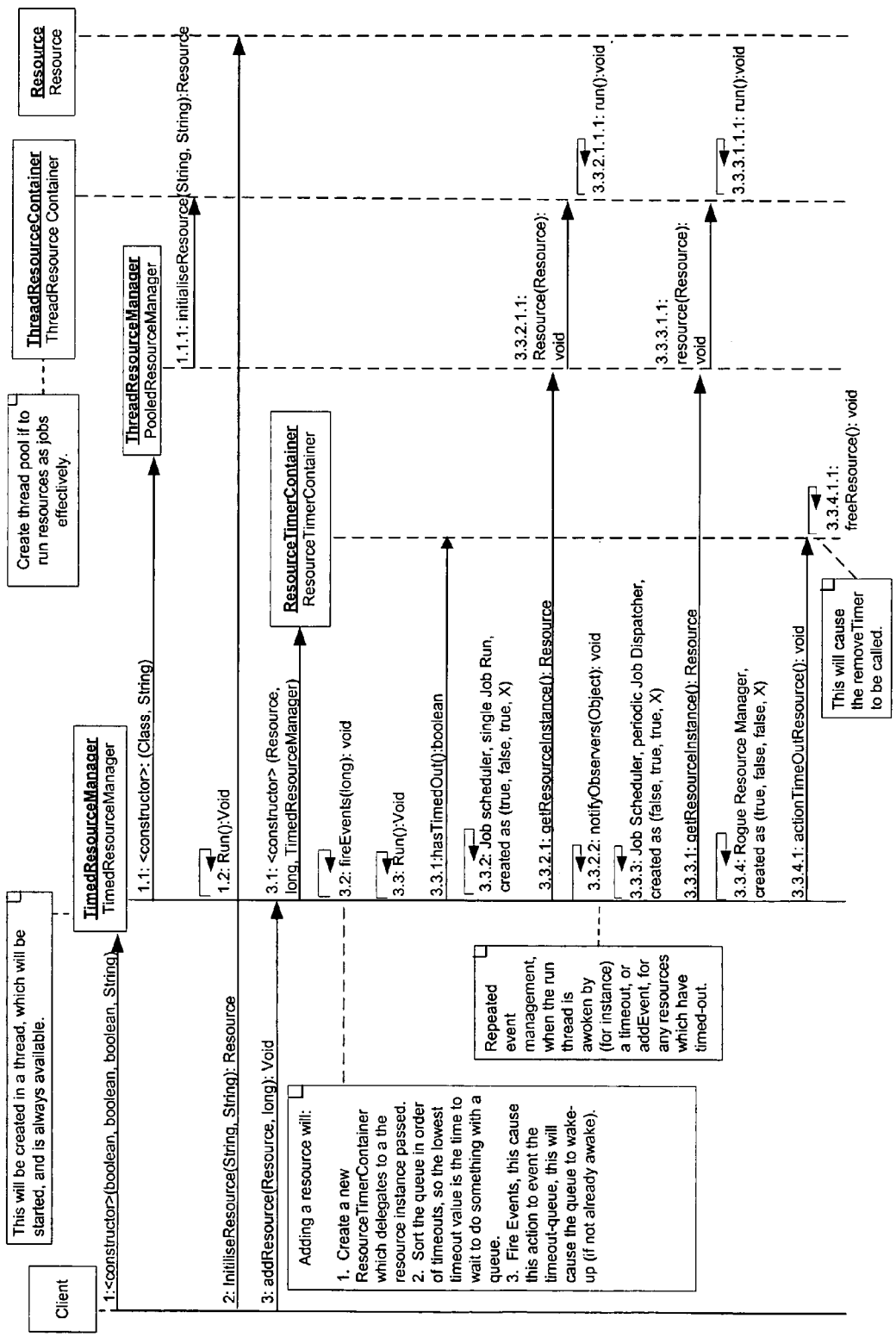
FIG. 19 is a sequence diagram for the addition of a resource that requires timeout management.

FIG. 17 illustrates an exemplary embodiment of a thread resource container class 1702 and a resource timer container class 1704. Objects of the thread resource container class 1702 implement a thread as a resource, and objects of the resource timer container class 1704 manage timing of the threads with respect to time-outs, i.e., manages rogue resources. The resource timer container class takes a time-out time and a resource instance as parameters to manage such timing. As shown in FIG. 18, the resource timer container class 1704 works with the timed resource manager class 1802 to manage resources that have time constraint requirements. FIG. 19 illustrates the addition of a resource that requires timeout management. An exemplary configuration of the timed resource manager class 1802 in the configuration source of deployer 108 is described in Section IV, subsection 3 below.

Figure 21:
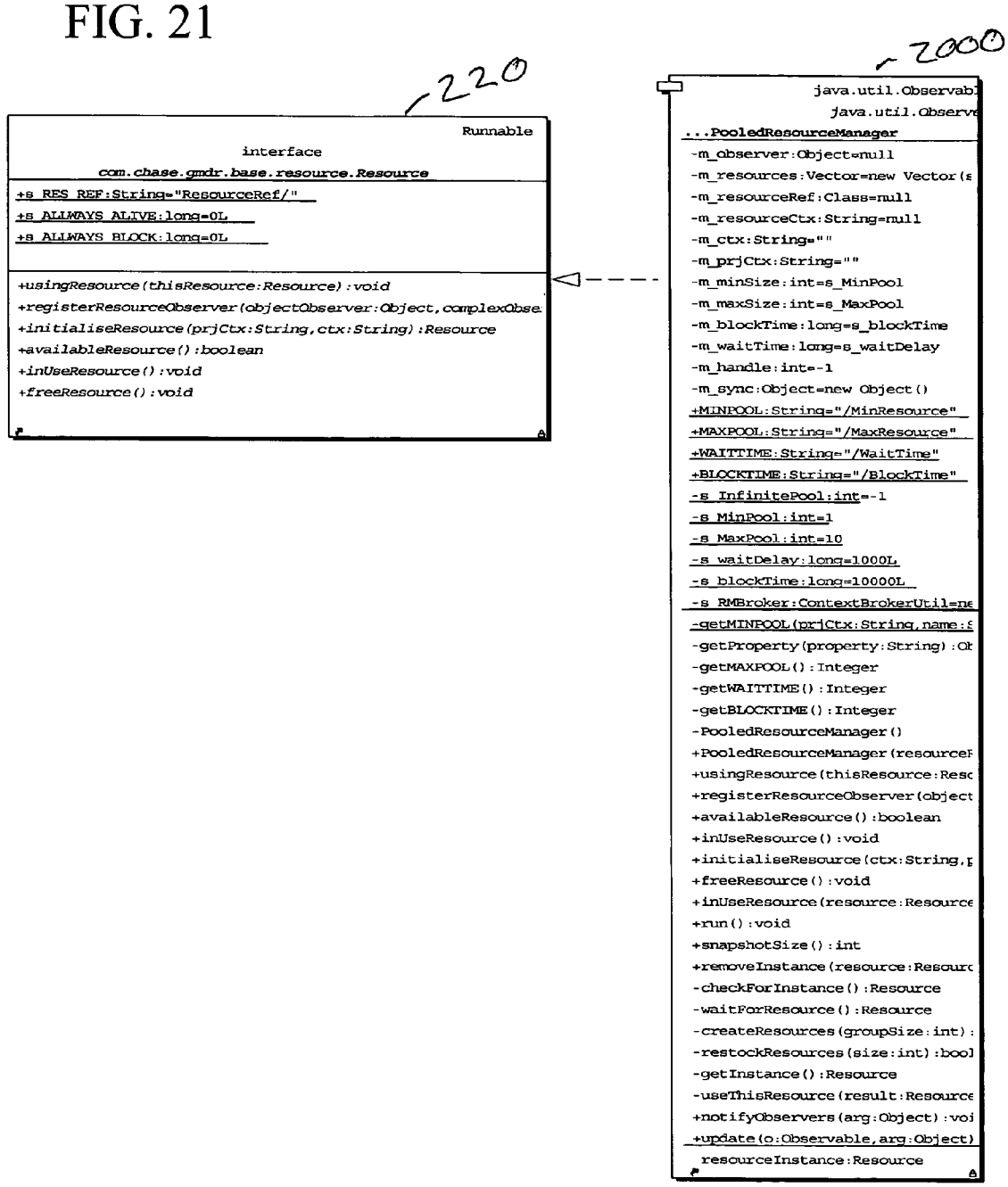
FIG. 21 illustrates the relationship between a Resource of FIG. 16 and a PooledResourceManager of FIG. 20.

FIG. 20 illustrates a pooled resource manager class 2000. This class, used by dispatcher 110, is responsible for managing the pool of resources. The pool of resources includes multiple instances of the job resource class 220. Such management includes creating, deleting, restocking, and reusing the resource instances in the pool in accordance with the configuration source of deployer 108. An exemplary configuration source for this class is discussed in Section IV subsection 2, and FIGS. 38 and 41 (3812, 4102) below. As shown in FIG. 20, a resource is borrowed from its pool using the get instance method 2002 and returned using the free resource method 2004. A resource is removed from the pool using the remove instance method 2006. The relationship between pooled resource manager class 2000 and a resource 220 is illustrated in FIG. 21.

Section III: Service Utilities

Figure 22:
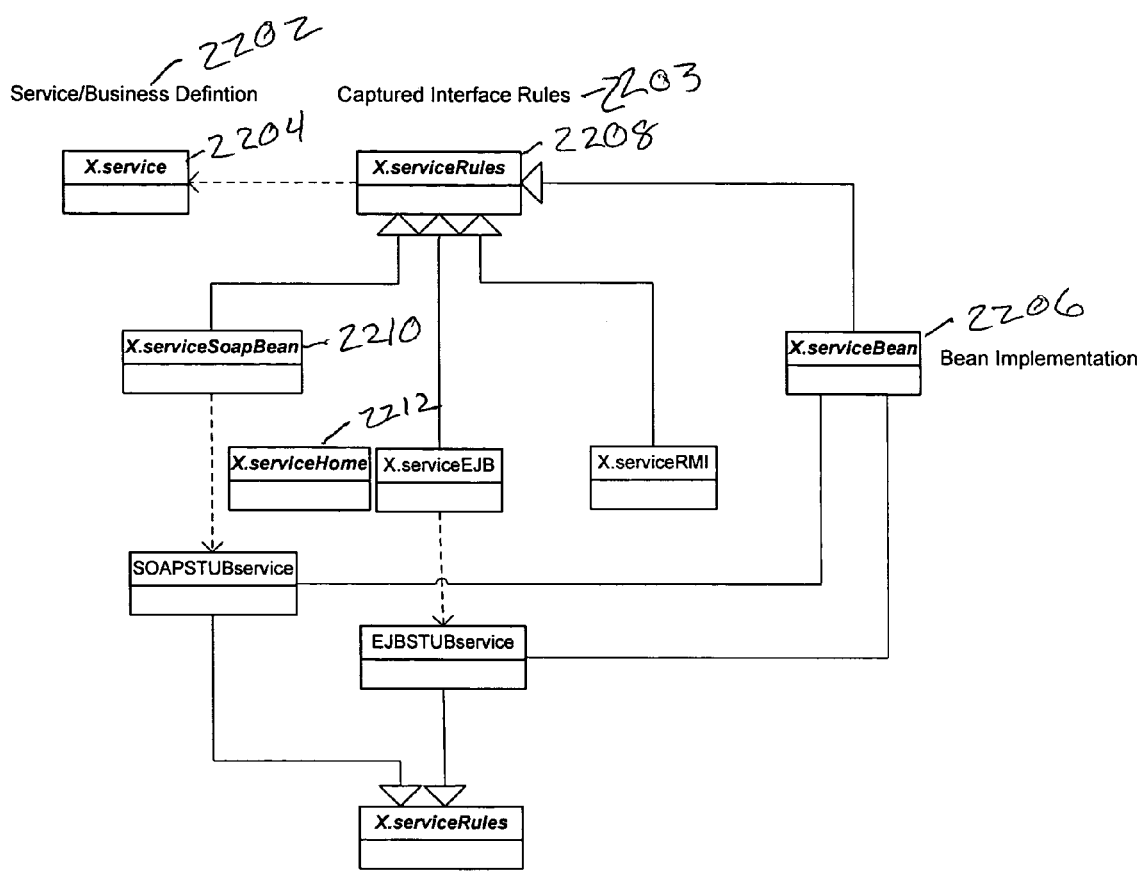
FIG. 22 illustrates a service definition in accordance with an exemplary embodiment of this invention, which is implemented as a set of rules for implementation class names and various implementations of the rules.

FIG. 22 illustrates an exemplary implementation of pluggable service 122 (FIG. 1). Pluggable service 122 completes the process of binding a job to a particular service at deployment time. FIG. 22 includes a service definition 2202 and a set of interface rules 2203. The boxes having names in bold in FIG. 22 are definitions within framework 100, and the other boxes are definitions provided external to the framework 100. In particular, Xservice 2204, XserviceBean 2206, XserviceRules 2208, XserviceSoapBean 2210, and XserviceHome 2212 are provided within the framework 100. In the names of these definitions, "service" represents the name of the service or process to be made a distributed component and "X" represents a package reference in Java. X.serviceRules 2208 includes the rules necessary to implement the pluggable service. X.serviceBean 2206 implements the serviceRules 2208. X.serviceHome 2212 is the implementation name of an EJB Home factory class. X.serviceSoapBean 2210 is an implementation of a SOAP service client.

FIG. 22 illustrates that, in a local scenario, a service manager will return an instance of serviceRules 2208 interface provided by a serviceBean 2206 instance. In a remote scenario, a service manager is guided by configuration parameters in the configuration source to the type of remote service, e.g., EJB. In this scenario, the service manager then acquires, via the Home class, a remote reference to the service. The actual remote service then implements the serviceRules 2208 and the service is again provided by a serviceBean 2206 instance.

FIG. 23 illustrates an exemplary embodiment of service broker helper class 2300. Objects of service broker helper class 2300 act as a factory for the creation and/or access of a service. The method "get new service" 2302 subscribes to a service, and the method "remove service" 2304 unsubscribes to the service. The class delegates to a registered set of services that provide the life-cycle functionality for subscription and removal of a service. An exemplary configuration of the service broker helper class is described in Section IV, subsections 7 to 9.

Figure 25:
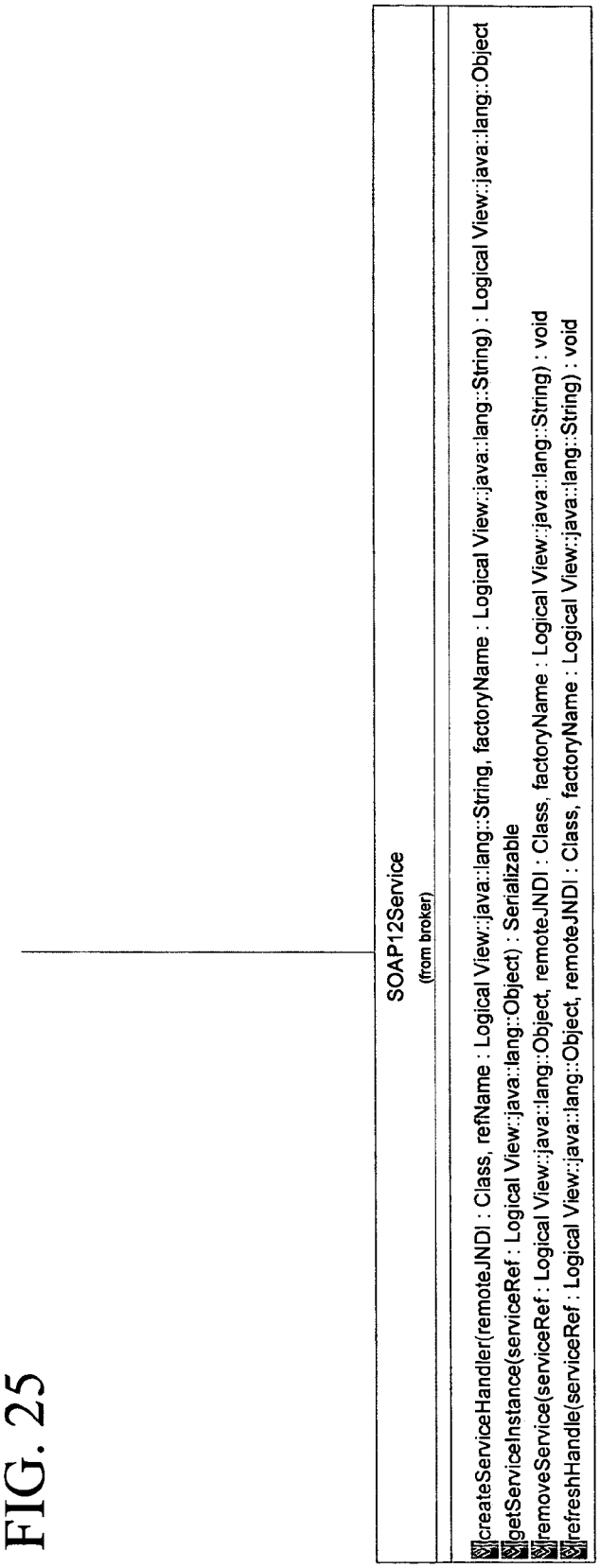
FIG. 25 is an exemplary SOAP12 Service in accordance with an exemplary embodiment of this invention.

FIG. 24 illustrates an exemplary embodiment of delegate service class 2400. Objects of this class manage service life-cycle management for a particular service middleware implementation. FIG. 25 represents a SOAP1.2 implementation of this interface. Implementations may also be provided for EJB and SOAP delegate services. Any new service which a Job Resource delegates to via the pluggable service described here would require registration with the service broker helper class and an implementation of the delegate service interface.

Figure 26:
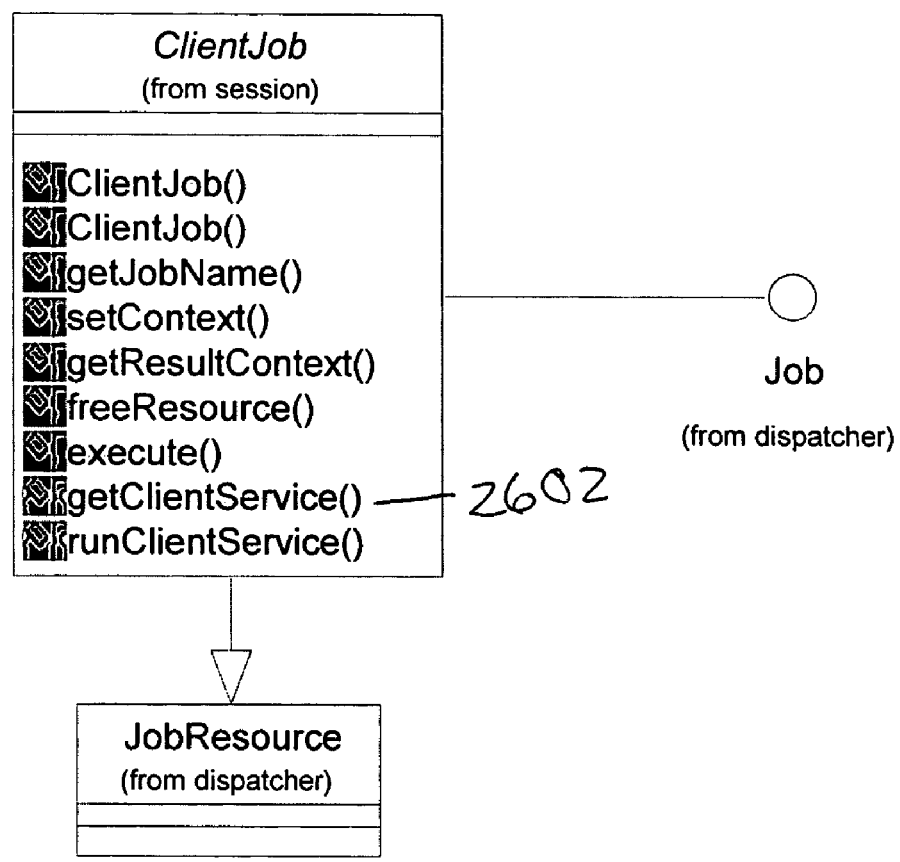
FIG. 26 is an exemplary Client Job in accordance with an exemplary embodiment of this invention.

Referring to FIG. 26, a number of options are available to implement a JobResource service. To use the one described here, a client delegates to a service in the execute method, as shown in FIG. 26 and example code in FIG. 27a-27c. This delegates to a service reference via the method getClientService( ) 2602, the kind of service defined in the ServiceReference.class.

The exemplary implementation of the framework 100 uses a standard set of service types, such as "EJB," "SOAP1.2," "RMI," and "ORB" (for CORBA). However, the invention is not limited to these services, and by design, is easily modified to accommodate other services. Each of these standard service types is expected to have an associated registration with the service broker as a delegate service implementation. The delegate service performs any caching required for efficient use of resources and the service broker helper manages any retries on a service type access failure. In the exemplary implementation, the default service is EJB, if the service type is not a registered factory reference. An exemplary EJB configuration is described in connection with the service broker class described in Section IV, subsections 7 to 9.

Section IV: Exemplary Configuration Parameters

Figures 28, 29:
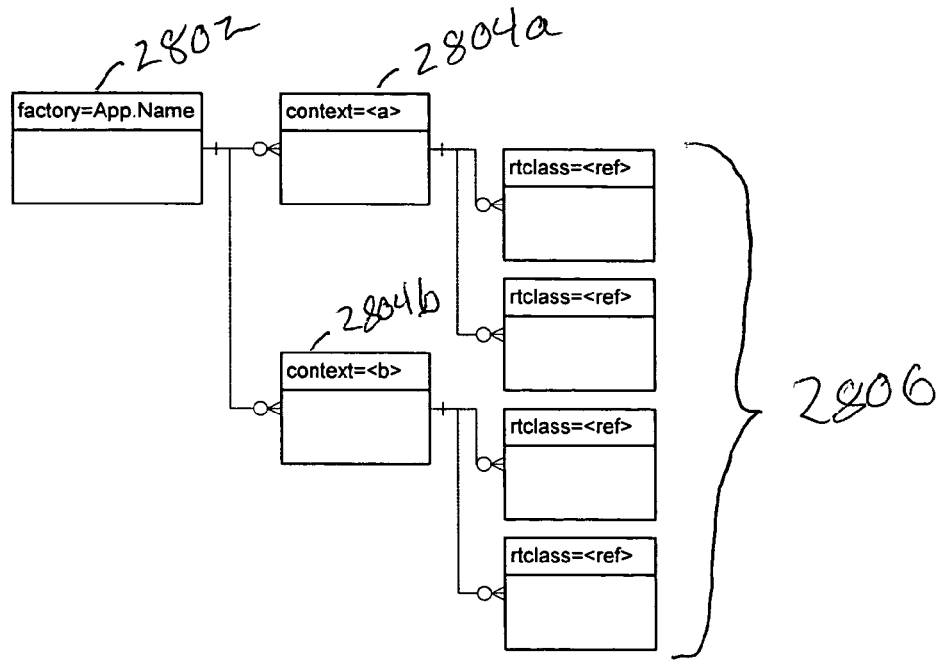

The exemplary implementation of the configuration source of deployer 108 uses a Lightweight Directory Access Protocol (LDAP) structure for organizing the configuration parameters of the framework 100. The hierarchy structure is three levels deep as illustrated in FIG. 28. A root node "factory" 2802 is the parent of a set of "context" nodes 2804a and 2804b that represent the name of the class to which the parameters belong. The context nodes 2804 have "rtclass" (record-type) nodes 2806 that contain the actual parameters for the class specified by the context node 2804. Exemplary rtclass nodes for particular classes are defined in FIGS. 29-37. FIGS. 38-41 illustrate exemplary parameter values stored in these rtclass nodes in a screen-shot format. By convention, FIGS. 29-35 show default values in square brackets [ ], and optional values with a "[-]". Another convention used by this specification and accompanying figures is to use the job representing the service or process fully qualified Java class name as context name (the service to run), e.g., if a job is defined as "a.b.c.d.MyJob.class," the context would be "context=a.b.c.d.MyJob."

Exemplary configuration parameters in the configuration file of deployer 108 are now described in the following subsections.

1. Dispatcher Daemon Configuration

Figure 40:
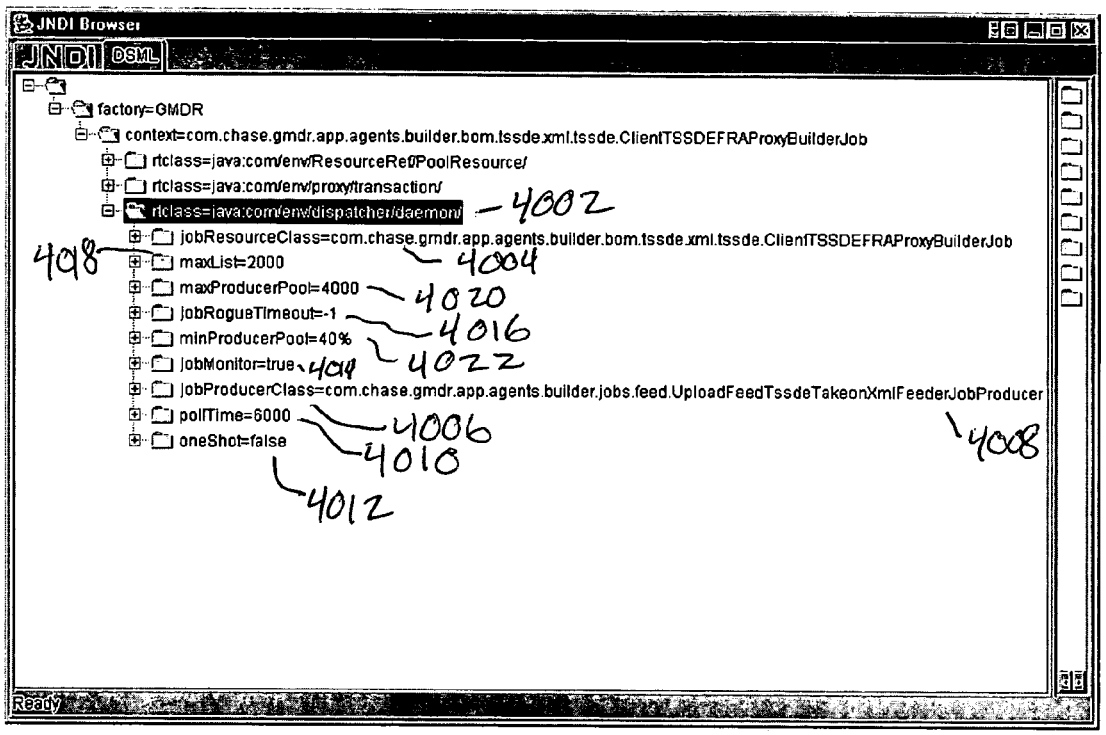

Exemplary configuration parameters for the dispatcher daemon class 204 are shown in FIG. 40 at 4002 and the specification of the associated rtclass nodes is described in FIG. 29. The exemplary rtclass nodes are:

jobResourceClass 4004 defines the name of a Job Resource derivative conforming to the service pattern described. Note that this node will usually be the same as the context name.

jobProducerClass 4006 defines the name of the Job Producer class, which in this case is a JobFeedProducer reference 4008.

argList defines further arguments to a dispatcher daemon implementation, specific in this case to the job to be executed.

pollTime 4010 defines the duration in milliseconds to wait to poll for a new job, or in this case this node is delegated to the JobFeederProducerManager instance (as it is an instance of a JobFeedProducer).

oneShot 4012 defines whether this process is a run only once (true) or is a deamon (false); so never finishes running.

jobMonitor 4014 displays processing information within the Dispatcher Daemon component.

jobRogueTimeout 4016 defines a duration in milliseconds, which, if defined (i.e., not −1) represents the maximum time a job is expected to take to process; if it takes longer to execute than the value of this node, it's deemed a rogue process.

maxList 4018 defines the maximum result set size for a Job Producer to return. −1 means the complete result set is returned.

numberOfRetries (not shown in FIG. 40) defines the number of times a dispatcher will re-run with failed jobs before giving up.

maxProducerPool 4020 defines the maximum number of pooled resources to be maintained in memory given that produced by a Job Feed Producer. This enables the size to be throttled to enable better memory resource management.

minProducerPool 4022 defines the minimum producer pool size reflecting the minimum number of pooled resources to be maintained in memory given that produced by a Job Feed Producer. This enables automatic refresh. This is a string as can be a percentage representation, e.g., 30% of the maxProducerPool 4020, or a number reflecting the min number of resources maintained in the job pool.

blockUntilData (shown in FIG. 29) defines that a JobFeedProducer will block a result set response if true if no data is available, up to 2*pollTime milliseconds.

exitCode (shown in FIG. 29) defines the exit code of this process on failure.

2. Dispatcher/Resource Pools

Figure 41:
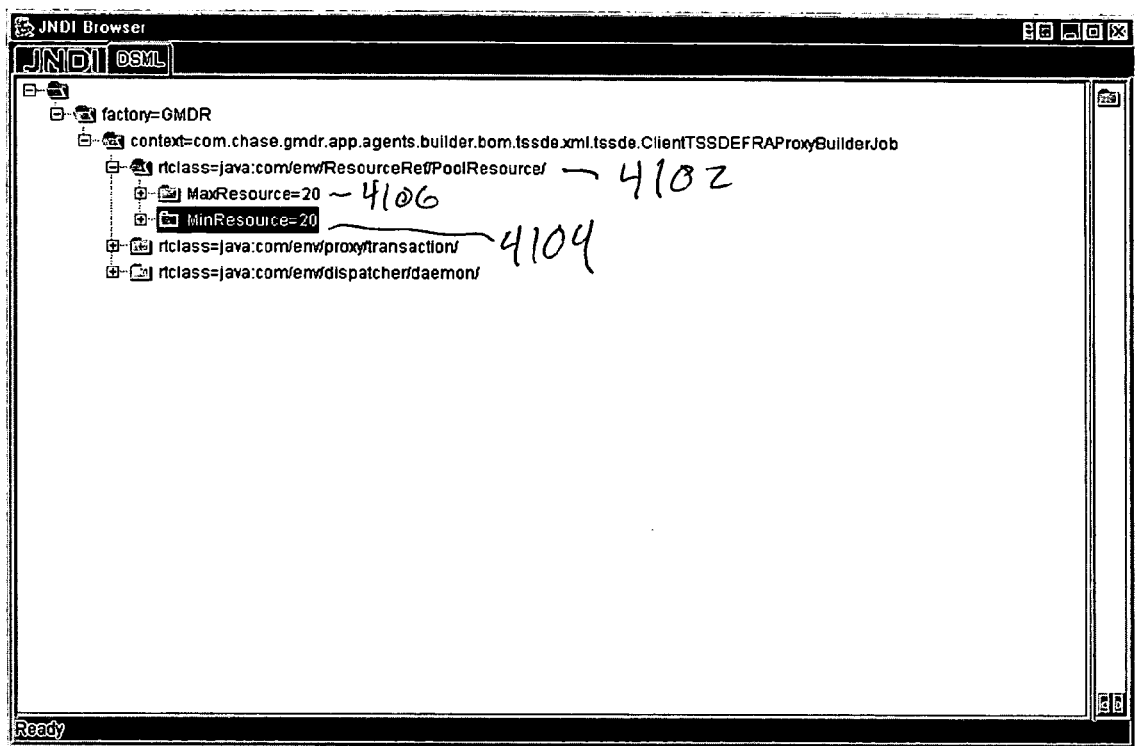

FIG. 41, at 4102, illustrates the exemplary configuration parameters for the resource pools managed by dispatcher 202. The specification of these rtclass nodes are described in FIG. 31. The exemplary rtclass nodes are:

MinResource 4104 defines minimum resource pool size.

MaxResource 4106 defines maximum resource pool size.

WaitTime (not shown in FIG. 31) defines the duration in milliseconds to wait for an event, in case there is an issue with a notification being lost, so a resource if available it will be picked up from by a waiting client.

BlockTime (not shown in FIG. 31) defines the duration in milliseconds to wait for a resource to become available.

3. Dispatcher/Timer Resource Configuration

Figure 38:
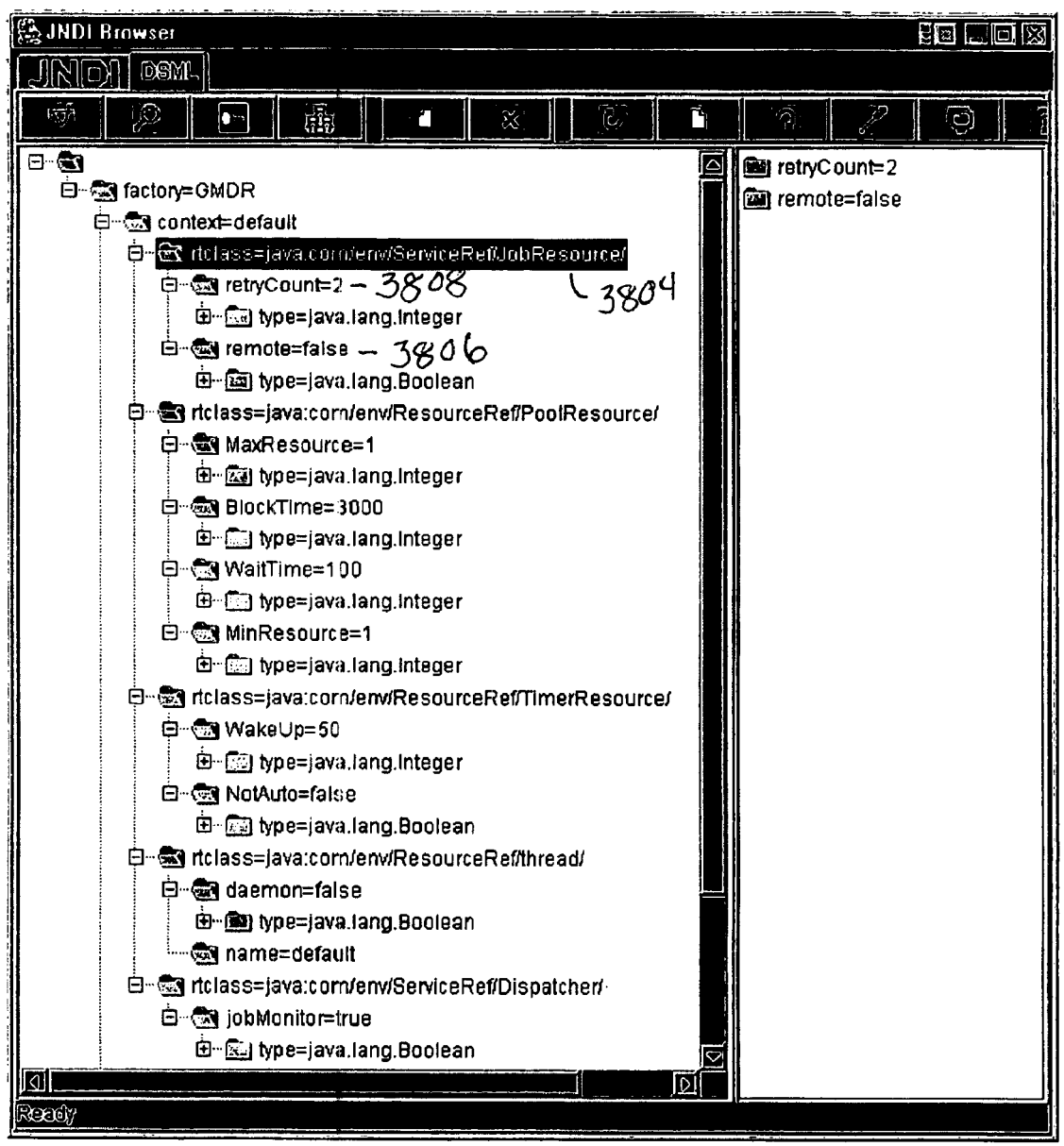
FIGS. 38 through 41 are exemplary values of the rtclass nodes of the configuration source.

Exemplary configuration parameters for the resource timer container class (FIG. 17) is shown in FIG. 38 (rtclass=java:com/env/ResourceRef/TimerResource 3810). The specification of these rtclass nodes is described in FIG. 33. The exemplary rtclass nodes are:

NotAuto 3816 defines whether the timer to manage resource timeouts should run automatically.

WakeUp 3814 defines a wait to be notified timeout to resolve any issues of many clients trying to wake this process up to refresh a resource.

4. Dispatcher/Thread Resource Configuration

FIG. 38 at 3818 illustrates the exemplary configuration parameters for the thread resource container class (FIG. 17). The specification of these rtclass nodes are described in FIG. 34. The exemplary rtclass nodes are:

name 3820 defines the thread resource group name deamon 3822 defines whether the thread is a daemon thread priority (shown in FIG. 34) defines the priority of the thread.

5. JobResource Configuration

FIG. 38 at 3804 illustrates the exemplary configuration parameters for the job resource class 220. The specification of these rtclass nodes are described in FIG. 35. The exemplary rtclass nodes are:

remote 3806 defines whether this resource is to process a remote job.

retryCount 3808 defines the number of times to retry the associated job on failure.

6. Service Deployment Component Configuration Parameters and standards

Figure 39:
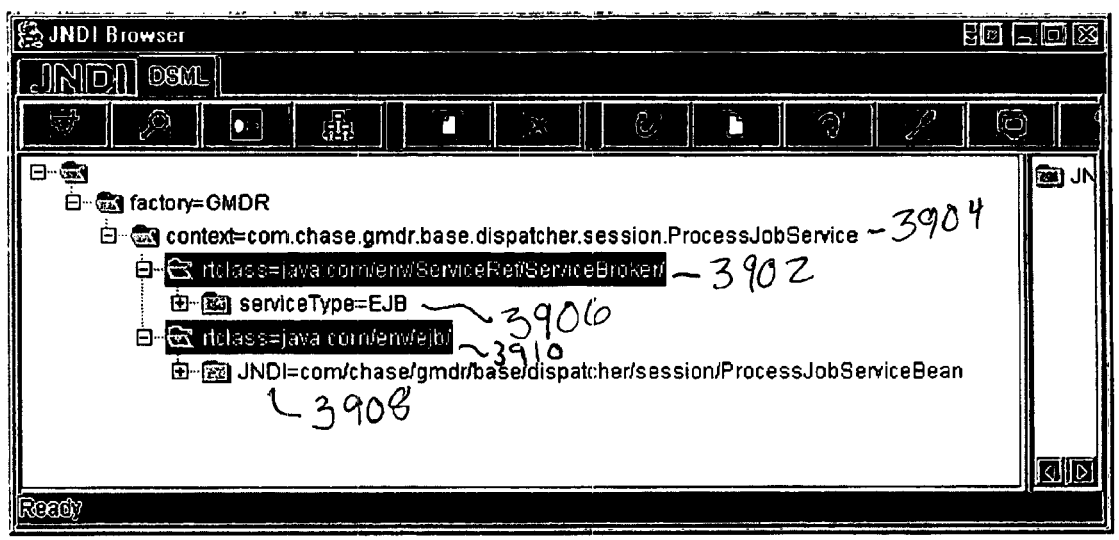

FIG. 39 illustrates configuration parameters for a process job service 3904. The process job service 3904 includes a service broker configuration 3902 and an EJB configuration 3910, respectively discussed in subsections 7 and 8 below.

7. ServiceBroker Configuration

The specification of the rtclass nodes associated with the service broker configuration 3902 is described in FIG. 30. The exemplary configuration parameters for the service broker 3902 are:

RetrieDelay (FIG. 30) defines the duration in milliseconds to wait before service access is retried in a failure to access service scenario.

RetrieCount (FIG. 30) defines the number of times to retry to access a service in a failure to access service scenario.

serviceType 3906 (see FIG. 39) defines the tag representing the middleware type the service is represented as. In this example, the value is "EJB."

8. EJB Configuration

The specification of the rtclass nodes associated with the EJB configuration 3910 is described in FIG. 32. It should be noted that although only a configuration for the EJB service is provided in the exemplary implementation, a configuration for all other available services would also be provided. The exemplary configuration parameter for this configuration is:

Java Naming and Directory Interface (JNDI) JNDI 3908 (see FIG. 39) represents JNDI name of the EJB service as defined in an application server.

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

What is claimed is:

1. A method for updating a developed software application provided on at least one computing device, wherein said developed software application is comprised of a plurality of tasks to be executed by said at least one computing device, said method comprising the steps of:

dividing said plurality of tasks into a plurality of smaller units of work, each of said plurality of smaller units of work creating a job to be executed on said at least one computing device;

binding a particular job to at least one of a plurality of services, wherein a configuration source, having computer-readable instructions independent of source code pertaining to said developed software application, is provided for binding said particular job with at least one particular service of said plurality of services; and executing said particular job on said at least one computing device using said at least one particular service to assist in completing one of said plurality of tasks;

wherein updating a task associated with said developed software application is achieved by updating said configuration source, said configuration source being updated to bind said particular job with at least one updated service, and said updating of said configuration source being achieved without updating source code of said developed software application.

2. The method of claim 1, said method further comprising the steps of:

receiving and saving edits to said configuration source, said edited configuration source having computer-readable instructions for binding said particular job with said at least one updated service; and executing said particular job using said at least one updated service to assist in completing said corresponding task.

3. The method of claim 1, wherein said configuration source further has computer-readable instructions for:

identifying a pool of resources for executing said job; and determining the manner in which said pool of resources are to be used to execute said job.

4. The method of claim 1, wherein said configuration source is implemented using a Lightweight Directory Access Protocol (LDAP) structure to organize configuration parameters.

5. The method of claim 1, wherein one of said plurality of services uses a service type including Simple Object Access Protocol (SOAP), Enterprise JavaBeans (EJB), Remote Method Invocation (RMI), and Common Object Request Broker Architecture (CORBA), a local service or a combination thereof.

* * * * *